US012797825B2

(12) United States Patent
Shin et al.

(10) Patent No.: US 12,797,825 B2
(45) Date of Patent: Nov. 17, 2026

(54) SUPER ABSORBENT POLYMER

(71) Applicant: LG Chem, Ltd., Seoul (KR)

(72) Inventors: Kwangin Shin, Seoul (KR); Jinyoung Hwang, Seoul (KR); Sung Soo Park, Seoul (KR); Junwye Lee, Seoul (KR); Dong Hoon Park, Seoul (KR)

(73) Assignee: LG Chem, Ltd., Seoul (KR)

( * ) Notice: Subject to any disclaimer, the term of this patent is extended or adjusted under 35 U.S.C. 154(b) by 41 days.

(21) Appl. No.: 19/292,312

(22) Filed: Aug. 6, 2025

(65) Prior Publication Data

US 2026/0042082 A1 Feb. 12, 2026

(30) Foreign Application Priority Data

Aug. 9, 2024 (KR) ........................ 10-2024-0106890

(51) Int. Cl.
*B01J 20/26* (2006.01)
*B01J 20/30* (2006.01)
*B01J 20/32* (2006.01)

(52) U.S. Cl.
CPC ......... *B01J 20/267* (2013.01); *B01J 20/3021* (2013.01); *B01J 20/3085* (2013.01); *B01J 20/321* (2013.01); *B01J 20/3219* (2013.01); *B01J 20/3234* (2013.01); *B01J 20/3293* (2013.01)

(58) Field of Classification Search
None
See application file for complete search history.

(56) References Cited

U.S. PATENT DOCUMENTS

| | | | |
|---|---|---|---|
| 2005/0239942 A1 | 10/2005 | Herfert et al. | |
| 2013/0026412 A1 | 1/2013 | Machida et al. | |
| 2014/0193641 A1 | 7/2014 | Torii et al. | |
| 2015/0093575 A1 | 4/2015 | Naumann et al. | |
| 2017/0189575 A1 | 7/2017 | Lee et al. | |
| 2017/0216817 A1 | 8/2017 | Torii et al. | |
| 2017/0233534 A1 | 8/2017 | Kim et al. | |
| 2019/0224645 A1* | 7/2019 | Kim | C08F 220/06 |
| 2020/0122119 A1* | 4/2020 | Jeong | B01J 20/3085 |
| 2021/0040271 A1 | 2/2021 | Lee et al. | |

FOREIGN PATENT DOCUMENTS

| | | | |
|---|---|---|---|
| EP | 3270857 | B1 | 12/2019 |
| EP | 3896097 | A1 | 10/2021 |
| EP | 4137534 | A1 | 2/2023 |
| EP | 4206244 | A1 | 7/2023 |
| EP | 4253451 | A1 | 10/2023 |
| EP | 4321559 | A1 | 2/2024 |
| JP | 2007512405 | A | 5/2007 |
| JP | 2014505151 | A | 2/2014 |
| JP | 2015503655 | A | 2/2015 |
| JP | 2017185485 | A | 10/2017 |
| KR | 20050036974 | A | 4/2005 |
| KR | 20140038998 | A | 3/2014 |
| KR | 20150062959 | A | 6/2015 |
| KR | 20150142636 | A | 12/2015 |
| KR | 20170063818 | A | 6/2017 |
| KR | 101848470 | B1 | 4/2018 |
| KR | 101908142 | B1 | 10/2018 |
| KR | 20200062012 | A | 6/2020 |
| KR | 20210101251 | A | 8/2021 |
| KR | 20220046497 | A | 4/2022 |
| KR | 20220068184 | A | 5/2022 |
| KR | 20220169431 | A | 12/2022 |
| KR | 20220169437 | A | 12/2022 |
| KR | 20220169444 | A | 12/2022 |
| KR | 102584470 | B1 | 10/2023 |

OTHER PUBLICATIONS

George Odian, "Principles of Polymerization" , Wiley-Interscience, Feb. 2004. 839 pages.

Kim, Hae Chan, "Superabsorbent polymer with enhanced gel strength and heat resistance using itaconic acid-based oligomer", Polymers for Advanced Technologies, vol. 34, pp. 2564-2572, Apr. 25, 2023.

Menceloglu, Y., et al., "Triblock Superabsorbent Polymer Nanocomposites with Enhanced Water Retention Capacities and Rheological Characteristics", ACS Omega, vol. 7, Issue 24, pp. 20486-20494, Jun. 8, 2022.

* cited by examiner

*Primary Examiner* — Tanisha Diggs
(74) *Attorney, Agent, or Firm* — Lerner David LLP

(57) ABSTRACT

Provided is a super absorbent polymer, which is a polyacrylic acid (salt)-based super absorbent polymer, and comprises carbon, oxygen, and silicon on a surface thereof, wherein a spectrum derived from analyzing the surface of the super absorbent polymer via Fourier-transform infrared spectroscopy (FT-IR) satisfies Equation 1:

$$X_{COOH} \leq 2.6 \quad \text{[Equation 1]}$$

wherein in Equation 1, $X_{COOH}$ is a value determined by dividing an integrated value of a region corresponding to a COOH functional group within the spectrum by an integrated value of a region corresponding to a $CH_2$ functional group within the spectrum.

19 Claims, 1 Drawing Sheet

[FIG. 1]
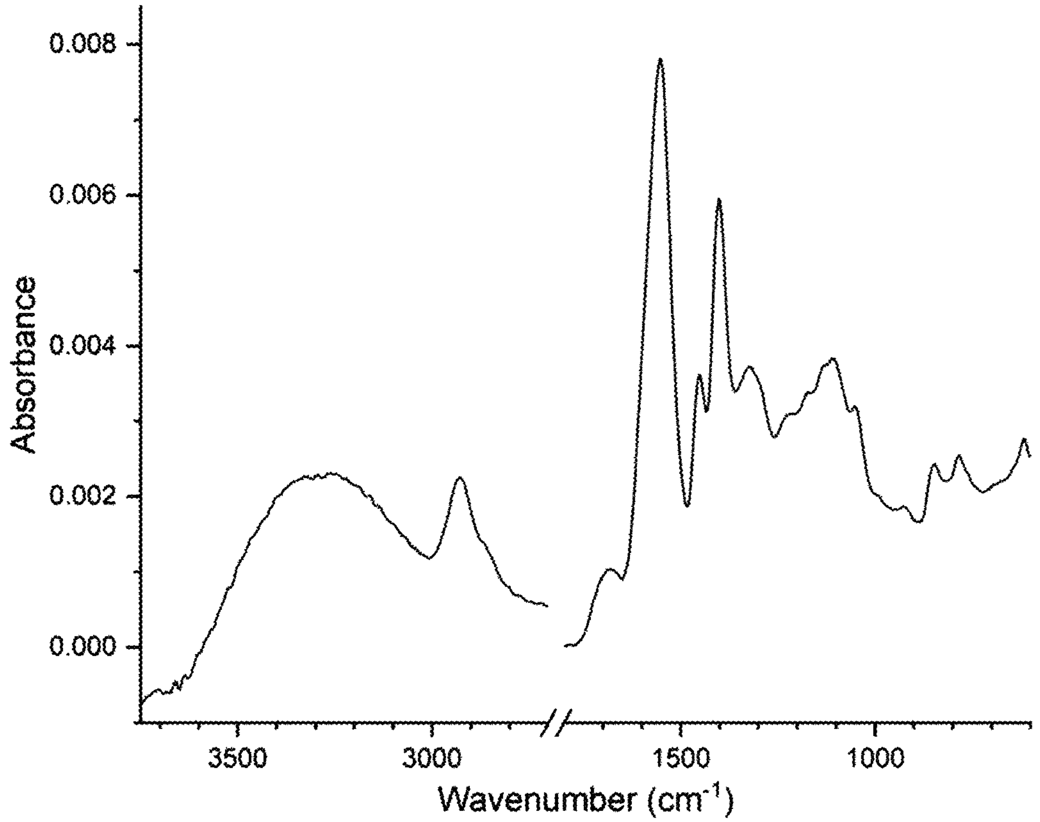
[FIG. 2]
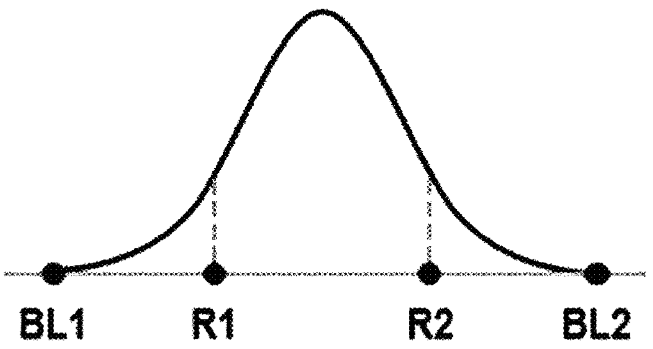

SUPER ABSORBENT POLYMER

CROSS-REFERENCE TO RELATED APPLICATION

This application claims priority to Korean Patent Application No. 10-2024-0106890, filed on Aug. 9, 2024, the disclosure of which is incorporated herein by reference in its entirety.

BACKGROUND

The present disclosure relates to a super absorbent polymer exhibiting improved absorption rate and absorption performance.

Super absorbent polymers (SAPs) are synthetic polymer materials capable of absorbing 500 to 1,000 times its own weight in water, and each developer offers different names for the polymers, such as SAM (Super Absorbency Material) or AGM (Absorbent Gel Material). The super absorbent polymers as described above began to be put to practical use for feminine hygiene products, and are now widely used as a soil conditioner for gardening, a water-retaining material for civil engineering and construction, a sheet for raising seedings, a freshness-preserving agent in the food distribution industry, and a steaming agent.

These super absorbent polymers are widely used in hygiene products such as diapers and sanitary pads. In these hygiene products, the super absorbent polymers are typically included in a state dispersed within pulp. Yet, more recently, efforts are continuously being made to provide hygiene products, such as diapers, which are being made thinner, and as part of these efforts, the development of so-called pulpless products, in which the pulp content is reduced or even no pulp is used at all, is actively being pursued.

Such hygiene products, where the pulp content is reduced or no pulp is used, contain a relatively high proportion of super absorbent polymers, which are inevitably present in multiple layers in the products. For the overall super absorbent polymer particles included in multiple layers to more efficiently absorb a large amount of liquid such as urine, the super absorbent polymers need to essentially exhibit high absorbency as well as a fast absorption rate. Meanwhile, to enhance these absorption properties, the most common approach involves forming a porous structure in a super absorbent polymer, thereby increasing a surface area, and typically, a method of forming a porous structure in a base resin powder by including a foaming agent in a monomer composition and performing cross-linking polymerization to expand a surface area of a super absorbent polymer is used.

However, the use of a foaming agent leads to a decrease in various physical properties of the super absorbent polymer, such as surface tension, liquid permeability, or bulk density, and also an increased generation of fine particles, and accordingly, there is a continuous demand for the development of technology capable of enhancing the absorption properties of super absorbent polymers without the use of a foaming agent.

Thus, the development of super absorbent polymers capable of fundamentally resolving these issues is under continuous demand.

SUMMARY

The present disclosure provides a super absorbent polymer (SAP) exhibiting excellent absorption properties by appropriately controlling ratios of various functional groups, such as COOH functional groups and COO-functional groups, present on a surface of the super absorbent polymer.

In accordance with an aspect of the present disclosure, there is provided a super absorbent polymer as a polyacrylic acid (salt)-based super absorbent polymer, including carbon, oxygen, and silicon on a surface thereof, wherein a spectrum derived from analyzing the surface of the super absorbent polymer via Fourier-transform infrared spectroscopy (FT-IR) satisfies Equation 1 below.

$$X_{COOH} \leq 2.6 \quad \text{[Equation 1]}$$

In Equation 1, $X_{COOH}$ refers to a value determined by dividing an integrated value of a region corresponding to a COOH functional group within the spectrum by an integrated value of a region corresponding to a $CH_2$ functional group within the spectrum.

BRIEF DESCRIPTION OF THE DRAWINGS

Aspects can be understood in more detail from the following description taken in conjunction with the accompanying drawings, in which:

FIG. 1 is a view showing an FTIR spectrum derived from Fourier-transform infrared spectroscopy (FT-IR) of Example 1; and FIG. 2 is a view schematically showing a process of calculating an integral value of a specific functional group.

DETAILED DESCRIPTION

Unless otherwise defined herein, all technical and scientific terms are used merely to describe representative aspects and are not intended to limit the present disclosure. The singular expression includes the plural expression unless the context clearly indicates otherwise. As used herein, the terms “comprise,” “include,” or “have” are intended to specify the presence of a feature, number, step, element, or combination thereof, but should be understood as not excluding in advance the possibility of the presence or addition of one or more other features, numbers, steps, elements, or combinations thereof.

The present disclosure may have various modifications and may take various forms, and thus specific aspects are illustrated and described in detail below. However, this is not intended to limit the present disclosure to a specific disclosed form, but should be understood to include all modifications, equivalents, or alternatives included in the spirit and scope of the present disclosure.

The technical terminology used herein is intended only to refer to specific embodiments and is not intended to limit the present disclosure. Also, the singular forms used herein also include the plural forms unless the phrases clearly indicate the opposite meaning.

The term “polymer” as used herein means a polymerized state of a water-soluble ethylenically unsaturated monomer and may encompass all moisture content ranges or particle size ranges.

In addition, the term “super absorbent polymer” refers to, depending on the context, a cross-linked polymer, or a powder-form base resin composed of super absorbent polymer particles in which the cross-linked polymer is pulverized, or is used to collectively encompass those made suitable for commercialization through additional processes on the cross-linked polymer or the base resin, such as drying, grinding, classification, and surface cross-linking.

In addition, the term "chopping" refers to cutting a hydrogel polymer into small pieces in the millimeter unit to increase drying efficiency and is used to distinguish from pulverization to the micrometer or normal particle level.

In addition, the term "micronizing or micronization" refers to pulverizing a hydrogel polymer into particle diameters of tens to hundreds of micrometers and is used to distinguish from "chopping."

As used herein, element symbols used expressions described in the periodic table.

As used herein, '$X_A$' refers to a value obtained by dividing an integral value of a region corresponding to functional group A by an integral value of a region corresponding to a $CH_2$ functional group within a spectrum that shows main functional groups derived from Fourier-transform infrared spectroscopy (FT-IR) analysis of a surface of a super absorbent polymer. The polymer surface refers to a region corresponding to a depth of 1 μm to 2 μm with respect to an outermost layer of the polymer.

The functional group A is a major functional group present on the polymer surface, such as O—H, COO—, COOH, C—O—C, and Si—O.

In addition, the analysis using Fourier-transform infrared spectroscopy (FT-IR) involves analyzing a powder-type super absorbent polymer as a sample using a measurement method of ATR (Diamond) to derive a spectrum.

Subsequently, a baseline is set (baseline correction) with respect to specific points BL1 and BL2 for each functional group on the polymer surface, and then an integral value of a region of other specific points R1 and R2 is obtained. Specific descriptions of BL1, BL2, R1, and R2 are described in Table 2 below.

The process is repeated five times for each sample to obtain an average value, and this average value is defined as an integral value of a region corresponding to a specific functional group.

Then, an integral value of a region corresponding to the functional group A is divided by an integral value of a region corresponding to the $CH_2$ functional group among the integral values to calculate a value.

A final calculated value is defined as $X_A$.

That is, '$X_A$' refers to a relative integral value of the functional group A determined with respect to the integral value of the region corresponding to the $CH_2$ functional group in the spectrum above.

Hereinafter, a super absorbent polymer and a method for preparing the same according to specific aspects of the disclosure are described in more detail below.

I. Polyacrylic Acid (Salt)-Based Super Absorbent Polymer

A super absorbent polymer of the present disclosure is a polyacrylic acid (salt)-based super absorbent polymer, in which ratios of various functional groups, such as COOH functional groups and COO-functional groups, present on a surface of the super absorbent polymer are controlled by appropriately adjusting various process conditions during a preparation process of the polymer.

The adjusting of process conditions means, for example, adjusting the type or content of additives in a surface cross-linking process, or adjusting polymerization and pulverization process conditions. Accordingly, the ratio of the COOH functional group present on the surface of the super absorbent polymer may be controlled to satisfy Equation 1 below.

$$X_{COOH} \leq 2.6 \quad \text{[Equation 1]}$$

In Equation 1, $X_{COOH}$ refers to a value determined by dividing an integrated value of a region corresponding to a COOH functional group within the spectrum by an integrated value of a region corresponding to a $CH_2$ functional group within the spectrum.

A super absorbent polymer (SAP) is prepared by cross-linking polymer main chains composed of carbon atoms to form a network structure, and attaching hydrophilic ion molecules to the network structure, or by polymerizing ion molecules themselves into polymer main chains and forming a cross-link. This process may be defined as chemical cross-linking.

In addition, by forming a surface cross-linked layer through a surface cross-linking process, properties of the super absorbent polymer may be improved. A surface of the super absorbent polymer includes carbon, oxygen, and silicon as main components. In this case, main functional groups present on the surface include a COOH functional group, a COO-functional group, or the like.

The content of the COOH functional group present on the polymer surface may vary depending on conditions such as neutralization process or surface cross-linking process. Specifically, the content may be controlled by the degree of neutralization in the neutralization process of the polymer, and content of these functional groups may be controlled as each functional group is added or removed depending on the type of surface cross-linking agent, reaction temperature, reaction time, or the like in the surface cross-linking process.

Content of the COOH functional group on the polymer surface may affect a network structure of the super absorbent polymer, and thus may affect absorption characteristics of the super absorbent polymer. Specifically, the COOH functional group is a functional group present in the form of an organic acid, and thus undergoes relatively less ion dissociation compared to the COO-functional group which is partially neutralized, present in the form of a salt. Consequently, less electrostatic repulsion occurs when water is initially absorbed into the super absorbent polymer, and the rate at which the polymer main chains separate decreases. This is one of the factors that slows down the water absorption rate of the super absorbent polymer.

However, the COOH functional group present in the form of an organic acid may serve as an acid catalyst during surface reactions, and thus further facilitates the surface reactions contributing to the improvement of properties under pressure.

That is, a high content of COOH functional groups slows down the absorption rate but facilitates surface reactions, which benefits properties under pressure. Conversely, a low content of COOH functional groups results in a faster absorption rate but less efficient surface reactions, negatively impacting properties under pressure. For these reasons, the content of COOH functional groups may affect both the absorption rate and the properties under pressure of the super absorbent polymer, and thus ensuring an appropriate content is crucial for balancing the absorption rate and the properties under pressure.

In the present disclosure, for the reasons mentioned above, the content of various functional groups such as COOH and COO are measured as a relative value with respect to the $CH_2$ functional group, and the inventors of the present disclosure determined that ratios of these functional groups, with respect to the $CH_2$ functional group, affect absorption properties of the super absorbent polymer.

Specifically, as described above, it is determined that the ratios of COOH functional groups with respect to the $CH_2$ functional group may affect the absorption properties of the super absorbent polymers, and when the ratios of various functional groups with respect to the $CH_2$ functional group satisfy Equation 1, as well as Equations 2 to 6 below, the super absorbent polymer exhibits excellent absorption characteristics.

In the present disclosure, the dividing of the integrated value of regions corresponding to various functional groups by the integral value of the region of the $CH_2$ functional group is due to the characteristics of the method for preparing a super absorbent polymer. In the super absorbent polymer prepared by radical polymerization of an organic acid and a neutralized salt of the organic acid, in particular, preparation through radical polymerization of acrylic acid and sodium acrylate may be a main characteristic of the preparation method. Due to these characteristics, the polymer main chain of the super absorbent polymer is composed of repeating units of $CH_2$—CH, and is formed into a structure where various functional groups are bonded, with COOH and COO-functional groups as pendant groups on CH. Therefore, when the ratio of each functional group is expressed with respect to the $CH_2$ (functional) group, it may be calculated as a ratio of each functional group with respect to polymer main chain content of the super absorbent polymer. For this reason, ratios of functional groups were obtained by dividing various functional groups by the integral value of the region of the $CH_2$ group, and the relationship of these ratios was determined as described above.

In an aspect of the present disclosure, $X_{COOH}$ in Equation 1 may be 2.6 or less or 2.5 or less.

In an aspect of the present disclosure, the polymer may satisfy Equation 2 below.

$$X_{COO}+X_{COOH} \leq 18 \quad \text{[Equation 2]}$$

In Equation 2, $X_{COO}$ refers to a value determined by dividing an integrated value of a region corresponding to an asymmetric COO-functional group and a symmetric COO-functional group within the spectrum by an integrated value of a region corresponding to a $CH_2$ functional group within the spectrum.

In an aspect of the present disclosure, the polymer may satisfy Equation 3 below.

$$X_{COOH}/X_{COO} \leq 0.17 \quad \text{[Equation 3]}$$

In Equation 3, $X_{COO}$ refers to a value determined by dividing an integrated value of a region corresponding to an asymmetric COO-functional group and a symmetric COO-functional group within the spectrum by an integrated value of a region corresponding to a $CH_2$ functional group within the spectrum.

In an aspect of the present disclosure, the polymer may satisfy Equation 4 below.

$$X_{COOH}/X_{Asym.COO} \leq 0.22 \quad \text{[Equation 4]}$$

In Equation 4, $X_{Asym,COO}$ refers to a value determined by dividing an integrated value of a region corresponding to an asymmetric COO-functional group within the spectrum by an integrated value of a region corresponding to a $CH_2$ functional group within the spectrum.

In an aspect of the present disclosure, the polymer may satisfy Equation 5 below.

$$X_{Asym.COO}/X_{Sym.COO} \leq 4.75 \quad \text{[Equation 5]}$$

In Equation 5, $X_{Asym,COO}$ refers to a value determined by dividing an integrated value of a region corresponding to an asymmetric COO-functional group within the spectrum by an integrated value of a region corresponding to a $CH_2$ functional group within the spectrum, and $X_{Sym,COO}$ refers to a value determined by dividing an integrated value of a region corresponding to a symmetric COO-functional group within the spectrum by an integrated value of a region corresponding to a $CH_2$ functional group within the spectrum.

Herein, the $COO^-$ functional group includes a symmetric $COO^-$ functional group and an asymmetric COO functional group.

In an aspect of the present disclosure, $X_{COO}$+$X_{COOH}$ in Equation 2 may be 18 or less or 17.5 or less. In addition, $X_{COO}$+$X_{COOH}$ in Equation 2 may be 8 or greater or 9 or greater.

In an aspect of the present disclosure, $X_{COO}$ may be 16 or less or 15 or less.

In an aspect of the present disclosure, $X_{Asym,COO}$ may be 13 or less or 12.5 or less.

In an aspect of the present disclosure, $X_{Sym,COO}$ may be 3 or less and 2.9 or less.

In an aspect of the present disclosure, in the polymer, $X_{OH}$ may be 20 or less or 19 or less. $X_{OH}$ refers to a value determined by dividing an integrated value of a region corresponding to an O—H functional group within the spectrum by an integrated value of a region corresponding to a $CH_2$ functional group within the spectrum.

The polymer includes carbon, oxygen, and silicon on a surface thereof.

In addition, in an aspect of the present disclosure, the surface of the polymer may further include at least one element of sodium, nitrogen, aluminum, or sulfur.

In an aspect of the present disclosure, the polymer may satisfy Equation 6 below.

$$X_{C-O-C} + X_{Si-O} \leq 14 \quad \text{[Equation 6]}$$

In Equation 6, $X_{C—O—C}$ refers to a value determined by dividing an integrated value of a region corresponding to a C—O—C functional group within the spectrum by an integrated value of a region corresponding to a $CH_2$ functional group within the spectrum.

$X_{Si—O}$ refers to a value determined by dividing an integrated value of a region corresponding to an Si—O functional group within the spectrum by an integrated value of a region corresponding to a $CH_2$ functional group within the spectrum.

In an aspect of the present disclosure, $X_{C—O—C}+X_{Si—O}$ in Equation 6 may be 14 or less, 13 or less, or 12 or less. In addition, $X_{C—O—C}+X_{Si—O}$ in Equation 6 may be 3 or greater or 4 or greater.

In the case of the C—O—C functional group and the Si—O functional group, since C—O—C peaks and Si—O peaks overlap, it is difficult to separately determine the ratios of the C—O—C and Si—O functional groups, and when Equation 6 is satisfied, the super absorbent polymer may have even better properties under pressure and liquid permeability.

First, as shown in the reaction scheme below, the C—O—C functional group is a byproduct formed through a surface cross-linking reaction, and thus a higher content of this functional group indicates that more surface cross-linking reactions have occurred.

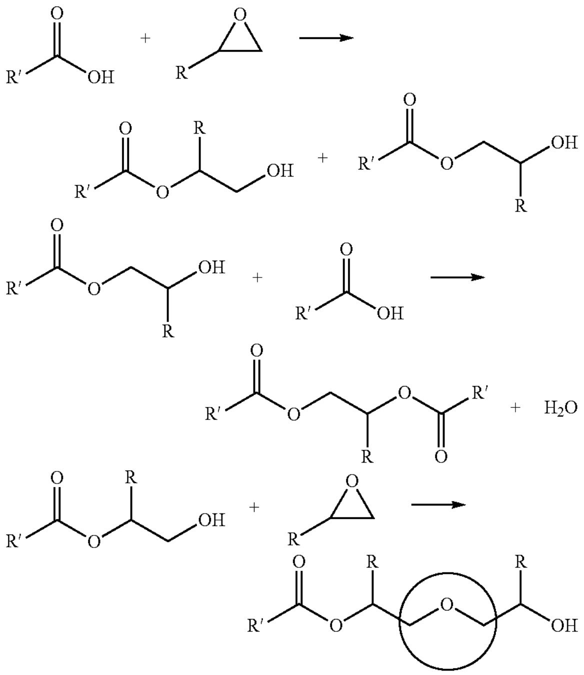

However, when the surface cross-linking reaction occurs excessively, the hydrophobicity of the surface increases, negatively impacting the absorption rate and the centrifuge retention capacity of the super absorbent polymer. Conversely, when the surface cross-linking reaction is insufficient, it may be difficult to secure properties under pressure. Therefore, it is desirable for an appropriate level of surface cross-linking reaction to occur, and the presence of C—O—C functional group in an appropriate ratio may indicate that a suitable level of surface cross-linking has taken place.

In addition, the Si—O functional group is related to silica, which serves as a liquid permeability enhancer and an anti-caking agent for super absorbent polymers, and the ratio thereof may change depending on silica content.

In this case, when an excessive amount of silica is added, properties under pressure may be degraded and dusting may become severe. Conversely, when a small amount of silica is added, the super absorbent polymer may experience severe caking and reduced liquid permeability in a humid environment.

For these reasons, the ratio of C—O—C and Si—O functional groups may affect the surface network structure of the super absorbent polymer, which may affect the properties under pressure and the liquid permeability of the super absorbent polymer. When the ratio of C—O—C and Si—O functional groups on the surface of the super absorbent polymer satisfies Equation 6, the super absorbent polymer may achieve even better properties under pressure and liquid permeability.

In an aspect of the present disclosure, the polymer may satisfy at least one of Equations 1 to 6. In addition, the polymer may satisfy all of Equations 1 to 6.

In an aspect of the present disclosure, in the super absorbent polymer, extractable contents may be present in an amount of 10 wt % or less, 9.5 wt % or less, or 9 wt % or less, with respect to a total weight of the super absorbent polymer as measured after free swelling in water having an electrical conductivity of 100 to 130 μS/cm for 30 minutes.

In addition, in an aspect of the present disclosure, in the super absorbent polymer, extractable contents may be present in an amount of 17 wt % or less, 16 wt % or less, or 15 wt % or less, with respect to a total weight of the super absorbent polymer as measured after free swelling in water having an electrical conductivity of 100 to 130 μS/cm for 3 hours.

"Extractable contents" refer to the contents of the polymer compounds that are not cross-linked during the process of preparing a super absorbent polymer, and may be generated when cross-linking is incomplete during polymerization of a super absorbent polymer, or when a cross-linking agent decomposes during chopping or drying processes, or when main polymer chains break.

When the super absorbent polymer is exposed to liquid, the extractable contents may be eluted, and most of the eluted extractable contents remain on the surface of the super absorbent polymer. This may cause a sticky surface of the super absorbent polymer and reduced liquid permeability. This may cause discomfort when the super absorbent polymer is used in an actual product.

That is, issues related to the cross-linking of the super absorbent polymer may be determined by measuring the amount of extractable contents eluted from a super absorbent polymer solution. That is, the amount of extractable contents is closely related to an inter-chain cross-linked structure within the super absorbent polymer, and thus a greater amount of the eluted extractable contents indicates an incomplete inter-chain cross-linked structure within the super absorbent polymer.

For these reasons, the amount of the eluted extractable contents may be used to determine whether the super absorbent polymer exhibits excellent performance in terms of cross-linking.

That is, when surface cross-linking proceeds uniformly, the amount of extractable contents eluted through the surface may be reduced. This indicates that the super absorbent polymer exhibits excellent performance in terms of cross-linking.

The super absorbent polymer according to the present disclosure satisfies Equation 1 for a ratio of the COOH functional group, which is one of the main functional groups present on the surface. This indicates that surface cross-linking of the super absorbent polymer has proceeded uniformly. Consequently, the super absorbent polymer according to the present disclosure may reduce the amount of eluted extractable contents, and the amount of the eluted extractable contents may satisfy the range above.

In addition, a case where the COO-functional group, which is another main functional group present on the surface, satisfies at least one of Equations 2 to 5 in relation to the COOH functional group indicates that surface cross-linking has proceeded more uniformly, and accordingly, the amount of extractable contents eluted from the super absorbent polymer may be reduced.

That is, when at least one of Equations 2 to 5 is further satisfied, the super absorbent polymer may achieve even better performance in terms of cross-linking.

The super absorbent polymer is widely used in sanitary products such as diapers, and thus the amount of extractable contents eluted is also evaluated using a 0.9% saline solution, which is similar to urine discharged from the body, in terms of ion concentration and electrical conductivity.

However, the super absorbent polymer is also widely used as a soil conditioner for gardening, a water-retaining material for civil engineering and construction, a sheet for raising seedings, a freshness-preserving agent in the food distribution industry, and a steaming agent, in addition to sanitary products. In this case, absorption behavior in water having an electrical conductivity of 100 to 130 μS/cm needs to be excellent.

That is, even when the same super absorbent polymer is used, the absorption behavior in water having an electrical conductivity of 100 to 130 μS/cm and the absorption behavior in 0.9% saline water having an electrical conductivity of about 16,100 μS/cm are different.

The amount of extractable contents is closely related to the inter-chain cross-linked structure within the super absorbent polymer. When using a 0.9% saline water, the super absorbent polymer expands less in volume, resulting in a lower elution of extractable contents. However, when using water having an electrical conductivity of 100 to 130 μS/cm, the super absorbent polymer expands more, leading to inter-chain separation in the super absorbent polymer, which in turn increases the elution of extractable contents, and this allows for a more accurate understanding of the correlation between the inter-chain cross-linked structure in the super absorbent polymer and the absorption behavior.

For example, even when two different super absorbent polymers show the same amount of extractable contents in 0.9% saline water, the amount of extractable contents in water having an electrical conductivity of 100 to 130 μS/cm may vary significantly depending on cross-linking characteristics. This is because the degree of cross-linking in the super absorbent polymer affects the amount of extractable contents.

For this reason, experimental results for the elution of extractable contents and absorption characteristics after free swelling using 0.9% saline water having an electrical conductivity of about 16,100 μS/cm may not be directly compared with experimental results obtained after free swelling using water having an electrical conductivity of 100 to 130 μS/cm, as in the present disclosure.

That is, when the same super absorbent polymer is used, the absorption behavior in water having an electrical conductivity of 100 to 130 μS/cm and the absorption behavior in 0.9% saline water having an electrical conductivity of about 16,100 μS/cm are bound to be different, and accordingly, the content of extractable contents after free swelling using water having an electrical conductivity of 100 to 130 μS/cm for 1 hour may not be usable to predict the amount of extractable contents after free swelling using 0.9% saline water having an electrical conductivity of about 16,100 μS/cm, and vice versa.

Therefore, to achieve a super absorbent polymer exhibiting excellent property balance by improving both absorption characteristics and liquid permeability, understanding the amount of eluted extractable contents, absorption performance, and absorption rate in water having an electrical conductivity of 100 to 130 μS/cm has independent significance, separate from using 0.9% saline water having an electrical conductivity of about 16,100 μS/cm.

The method for measuring the amount (wt %) of extractable contents in water having an electrical conductivity value of 100 to 130 μS/cm is described in more detail in Experimental Examples described below.

In an aspect of the present disclosure, the super absorbent polymer may have a centrifuge retention capacity (CRC) of 30 g/g or greater, 33 g/g or greater, 34 g/g or greater, or 35 g/g or greater as measured according to EDANA method WSP 241.3. In addition, the centrifuge retention capacity measured through the same method may be 50 g/g or less, 45 g/g or less, or 40 g/g or less.

In addition, in an aspect of the present disclosure, the super absorbent polymer may have an absorbency under pressure (AUP) of 25 g/g or greater, 28 g/g or greater, 29 g/g or greater, or 30 g/g or greater as measured under 0.3 psi according to EDANA method WSP 242.3. In addition, the absorbency under pressure measured through the same method may be 45 g/g or less, 42 g/g or less, or 40 g/g or less.

Moreover, in an aspect of the present disclosure, the super absorbent polymer may have an effective absorption capacity (EFFC) of 30 g/g or greater, 31 g/g or greater, 32 g/g or greater, or 33 g/g or greater as calculated by Equation 7 below. In addition, the effective absorption capacity (EFFC) calculated by Equation 7 below may be 40 g/g or less, 39 g/g or less, 38 g/g or less, 37 g/g or less, or 36 g/g or less.

$$EFFC=(CRC+AUP)/2 \quad \text{[Equation 7]}$$

In Equation 7,

CRC refers to centrifuge retention capacity (unit: g/g) as measured according to a method of EDANA method WSP 241.3, and AUP refers to absorbency under pressure (unit: g/g) as measured under 0.3 psi according to EDANA method WSP 242.3.

In addition, in an aspect of the present disclosure, the super absorbent polymer may have extractable contents in an amount of 5 wt % or less, 4.8 wt % or less, 4.5 wt % or less, 4.3 wt % or less, 4 wt % or less, or 3.9 wt % or less, as measured after swelling for 1 hour according to a method of EDANA method WSP 270.3. A smaller value is better for the amount of extractable contents, with a theoretical lower limit being 0 wt %. However, it may be, for example, 0.1 wt % or greater or 1 wt % or greater.

In an aspect of the present disclosure, the super absorbent polymer may have a vortex time of 40 seconds or less as measured at 24.0° C. by a vortex measurement method.

More specifically, the vortex time may be 40 seconds or less, 38 seconds or less, 35 seconds or less, 33 seconds or less, or 30 seconds or less. In addition, a smaller value is better for the vortex time, with a theoretical lower limit of the vortex time being 0 seconds. However, it may be, for example, 10 seconds or more, 15 seconds or more, or 20 seconds or more.

The methods of measuring the centrifuge retention capacity, absorbency under pressure, and absorption rate of the super absorbent polymer are described in more detail in Experimental Examples described below.

In addition, the super absorbent polymer of the present disclosure may have a free swell capacity, which is a maximum capacity of water holdable by the super absorbent polymer when swollen in water having an electrical conductivity of 100 to 130 μS/cm for 1 minute, of 130 g or greater, 135 g or greater, 150 g or greater, 170 g or greater, 175 g or greater, 180 g or greater, or 185 g or greater, and 230 g or less, 225 g or less, or 220 g or less. This is a numerical value showing the absorption capacity of the super absorbent polymer.

The inventors of the present disclosure used water having an electrical conductivity of 100 to 130 μS/cm at 24° C., which is lower in ion concentration than the 0.9% saline water and has an electrical conductivity of about 1/100 of the electrical conductivity of 0.9% saline water (about 16,100 μS/cm at 24° C.), to determine a maximum capacity of water holdable by the super absorbent polymer. In an aspect, water having an electrical conductivity of 110 μS/cm at 24° C. was used. There is no significant difference in absorption characteristics according to electrical conductivity in the case of water within the range of electrical conductivity of 100 to 130 μS/cm.

The method for measuring absorption capacity in water having an electrical conductivity value of 100 to 130 μS/cm is described in more detail in Experimental Examples described below.

Meanwhile, the super absorbent polymer according to the present disclosure may be achieved by appropriately controlling preparation process conditions such as component/content of the super absorbent polymer, polymerization process conditions of the super absorbent polymer, or pulverizing process conditions. That is, by controlling these process conditions, a super absorbent polymer satisfying any one of Equations 1 to 6 is achievable.

For example, by controlling the type and content of a monomer composition in a polymerization process, the type and content of an internal cross-linking agent, the type, input amount and input timing of a surfactant in the neutralization and micronization steps, the type, input amount and input timing of a neutralizing agent, the type, rotation speed and hole size of a micronization device, the number of micronizations, or the like, the super absorbent polymer may be controlled to satisfy any one of Equations 1 to 6.

Hereinafter, each component of the super absorbent polymer is described in more detail.

A polyacrylic acid (salt)-based super absorbent polymer of an aspect of the disclosure includes a base resin including a cross-linked polymer of a water-soluble ethylenically unsaturated monomer having an acidic group and/or a salt thereof and an internal cross-linking agent. The cross-linked polymer may preferably be formed by polymerizing a monomer composition including components such as a monomer, an internal cross-linking agent, and a polymerization initiator.

In this case, the water-soluble ethylenically unsaturated monomer may be any monomer commonly used in the preparation of super absorbent polymers. As a non-limiting example, the water-soluble ethylenically unsaturated monomer may be a compound represented by Formula 1 below:

[Formula 1]

$$R—COOM'$$

In Formula 1,

R is an alkyl group having 2 to 5 carbon atoms containing an unsaturated bond, and M' is a hydrogen atom, a monovalent or divalent metal, an ammonium group, or an organic amine.

Preferably, the monomer may be at least one selected from the group consisting of (meth)acrylic acid, and monovalent (alkali) metal salts, divalent metal salts, ammonium salts, and organic amine salts of the acid.

As such, using (meth)acrylic acid and/or the salts thereof as a water-soluble ethylenically unsaturated monomer provides benefits to obtain a super absorbent polymer with improved absorbency. In addition, maleic anhydride, fumaric acid, crotonic acid, itaconic acid, 2-acryloylethane sulfonic acid, 2-methacryloylethane sulfonic acid, 2-(meth)acryloylpropanesulfonic acid or 2-(meth)acrylamide-2-methyl propane sulfonic acid, (meth)acrylamide, N-substituted (meth)acrylate, 2-hydroxyethyl (meth)acrylate, 2-hydroxypropyl (meth)acrylate, methoxypolyethylene glycol (meth)acrylate, polyethylene glycol (meth)acrylate, (N,N)-dimethylaminoethyl (meth)acrylate, (N,N)-dimethylaminopropyl (meth)acrylamide, or the like may be used as the monomer.

The water-soluble ethylenically unsaturated monomer has an acidic group. Meanwhile, in the preparation of super absorbent polymers, a monomer in which at least a portion of the acidic groups are neutralized by a neutralizing agent is cross-linked and polymerized to form a polymer. However, in the present disclosure, preferably, the acidic groups are not neutralized during polymerization but may be neutralized after forming the polymer. More specific details on this are described in a section on the preparation method of super absorbent polymers.

The concentration of the water-soluble ethylenically unsaturated monomer in the monomer composition may be appropriately adjusted in consideration of polymerization time and reaction conditions and may be about 20 to about 60 wt %, or about 20 to about 40 wt %.

The term "internal cross-linking agent" as used herein is a term used to distinguish from a surface cross-linking agent for cross-linking the surface of super absorbent polymer particles described below, and serves to form a polymer including a cross-linked structure by introducing a cross-linking bond between the unsaturated bonds of the water-soluble ethylenically unsaturated monomers described above.

The cross-linking in the above step is performed without distinction between the surface and the interior, but when the surface cross-linking process of the super absorbent polymer particles described below is performed, the surface of the finally prepared super absorbent polymer particles may include a structure newly cross-linked by the surface cross-linking agent, and the interior of the super absorbent polymer particles may maintain the structure cross-linked by the internal cross-linking agent as it is.

According to an aspect of the present disclosure, the internal cross-linking agent may include at least any one of a multifunctional acrylate compound, a multifunctional allylic compound, or a multifunctional vinyl compound.

Non-limiting examples of multifunctional acrylate compounds include ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, tripropylene glycol di(meth)acrylate, polypropylene glycol di(meth)acrylate, butanediol di(meth)acrylate, butylene glycol di(meth)acrylate, hexanediol di(meth)acrylate, pentaerythritol di(meth)acrylate, pentaerythritol tri(meth)acrylate, pentaerythritol tetra(meth)acrylate, dipentaerythritol di(meth) acrylate, dipentaerythritol tri(meth)acrylate, dipentaerythritol tetra(meth)acrylate, dipentaerythritol penta (meth)acrylate, trimethylolpropane di(meth)acrylate, trimethylolpropane tri(meth)acrylate, glycerin di(meth)acrylate, and glycerin tri(meth)acrylate, and these may be used alone or in combination of two or more.

Non-limiting examples of multifunctional allylic compounds include ethylene glycol diallyl ether, diethylene glycol diallyl ether, triethylene glycol diallyl ether, tetraethylene glycol diallyl ether, polyethylene glycol diallyl ether, propylene glycol diallyl ether, tripropylene glycol diallyl ether, polypropylene glycol diallyl ether, butanediol diallyl ether, butylene glycol diallyl ether, hexanediol diallyl ether, pentaerythritol diallyl ether, pentaerythritol triallyl ether, pentaerythritol tetraallyl ether, dipentaerythritol diallyl ether, dipentaerythritol triallyl ether, dipentaerythritol tetraallyl ether, dipentaerythritol pentaallyl ether, trimethylolpropane diallyl ether, trimethylolpropane triallyl ether, glycerin diallyl ether, and glycerin triallyl ether, and may be used alone or in combination of two or more.

Non-limiting examples of multifunctional vinyl compounds include ethylene glycol divinyl ether, diethylene glycol divinyl ether, triethylene glycol divinyl ether, tetraethylene glycol divinyl ether, polyethylene glycol divinyl ether, propylene glycol divinyl ether, tripropylene glycol divinyl ether, polypropylene glycol divinyl ether, butanediol divinyl ether, butylene glycol divinyl ether, hexanediol divinyl ether, pentaerythritol divinyl ether, pentaerythritol trivinyl ether, pentaerythritol tetravinyl ether, dipentaerythritol divinyl ether, dipentaerythritol trivinyl ether, dipentaerythritol tetravinyl ether, dipentaerythritol pentavinyl ether, trimethylolpropane divinyl ether, trimethylolpropane trivinyl ether, glycerin divinyl ether, and glycerin trivinyl ether, and these may be used alone or in combination of two or more. Preferably, pentaerythritol triallyl ether may be used.

The above-mentioned multifunctional allylic compound or multifunctional vinyl compound may form a cross-linked structure during the polymerization process by bonding two or more unsaturated groups contained in molecules with the unsaturated bonds of water-soluble ethylenically unsaturated monomers, or the unsaturated bonds of other internal cross-linking agents, and unlike the acrylate compound containing an ester bond (—(C═O)O—) in molecules, the cross-linked bond may be more stably maintained even during the neutralization process after the polymerization reaction described below.

Accordingly, the super absorbent polymer prepared may have increased gel strength, process stability may be increased during a discharge process after polymerization, and the amount of extractable contents may be minimized.

As described above, the extractable contents are mainly eluted when the super absorbent polymer absorbs liquid and expands, and thus a large amount of eluted extractable contents indicates inferior cross-linking characteristics in the super absorbent polymer. In addition, since most of the eluted extractable contents remain on the surface of the super absorbent polymer, when applied to an actual product and used, permeability may decrease, causing discomfort.

Therefore, as described above, it is necessary to minimize the amount of extractable contents in the super absorbent polymer.

The cross-linking polymerization of the water-soluble ethylenically unsaturated monomer in the presence of such an internal cross-linking agent may be performed in the presence of a polymerization initiator, a thickener if necessary, a plasticizer, a preservative stabilizer, an antioxidant, or the like.

In the monomer composition, such an internal cross-linking agent may be used in an amount of 0.01 to 5 parts by weight with respect to 100 parts by weight of the water-soluble ethylenically unsaturated monomer. For example, the internal cross-linking agent may be used in an amount of 0.01 parts by weight or greater, 0.05 parts by weight or greater, or 0.1 parts by weight or greater, and 5 parts by weight or less, 3 parts by weight or less, 2 parts by weight or less, 1 part by weight or less, or 0.7 parts by weight or less, with respect to 100 parts by weight of the water-soluble ethylenically unsaturated monomer. When the content of the internal cross-linking agent is too low, cross-linking may not take place sufficiently, making it difficult to achieve strength above an appropriate level, and when the content of the internal cross-linking agent is too high, the internal cross-linking density may increase, making it difficult to achieve a desired centrifuge retention capacity.

Meanwhile, when the content of the internal cross-linking agent is small to ensure that the base resin has high centrifuge retention capacity (CRC), the formed polymer may have reduced gel strength, and the operation of a chopper or the like may be difficult due to the low gel strength when chopping a hydrogel polymer. In this case, by mixing and using two or more types of internal cross-linking agents for the operation of a high-speed rotary chopper or the like, the gel strength may be increased, thereby improving the operation stability of the chopper or the like.

The particle shape of the formed hydrogel polymer may change depending on the degree of internal cross-linking, and the polymer formed using such an internal cross-linking agent may have a three-dimensional network structure in which the main chains formed by polymerizing the water-soluble ethylenically unsaturated monomers are cross-linked by the internal cross-linking agent.

As such, when the polymer has a three-dimensional network structure, the overall physical properties of the super absorbent polymer, such as centrifuge retention capacity and absorbency under pressure, may be significantly improved compared to the case of a two-dimensional linear structure that is not additionally cross-linked by the internal cross-linking agent.

The super absorbent polymer is a polymer in which a monomer and an internal cross-linking agent are polymerized in the presence of a polymerization initiator, and the type of the polymerization initiator is not particularly limited, but preferably, the polymerization may be performed using a thermal polymerization method in a batch reactor, and accordingly, a thermal polymerization initiator may be used as the polymerization initiator.

As the thermal polymerization initiator, at least one selected from the group consisting of a persulfate-based initiator, an azo-based initiator, hydrogen peroxide, and ascorbic acid may be used. Specifically, examples of a persulfate-based initiator include sodium persulfate ($Na_2S_2O_8$), potassium persulfate ($K_2S_2O_8$), and ammonium persulfate ($(NH_4)_2S_2O_8$), and examples of an azo-based initiator include 2,2-azobis(2-amidinopropane) dihydrochloride, 2,2-azobis-(N,N-dimethylene)isobutylamidine dihydrochloride, 2-(carbamoylazo)isobutylonitrile, 2,2-azobis [2-(2-imidazolin-2-yl)propane] dihydrochloride, 4,4-azobis-(4-cyanovaleric acid), and the like. More diverse thermal polymerization initiators are well-described in Odian's "Principle of Polymerization (Wiley, 1981)," p. 203, and are not limited to the examples described above.

Such polymerization initiators may be used in an amount of 2 parts by weight or less with respect to 100 parts by weight of the water-soluble ethylenically unsaturated monomer. That is, when the concentration of the polymerization initiator is too low, polymerization rate may slow down and a large amount of residual monomer may be extracted from a final product, which is not desirable. Conversely, when the concentration of the polymerization initiator is higher than the above range, a polymer chain forming a network becomes shorter, which increases the amount of extractable contents and lowers absorbency under pressure, thereby degrading the physical properties of the polymer, which is not desirable.

Meanwhile, in an aspect of the present disclosure, a reducing agent that forms a redox couple with the polymerization initiator described above is added to the monomer composition to initiate polymerization.

Specifically, the initiator and the reducing agent react with each other to form radicals when added to a polymer solution.

The formed radicals react with the monomer, and since the oxidation-reduction reaction between the initiator and the reducing agent is highly reactive, polymerization is initiated even when only small amounts of the initiator and reducing agent are added, so that there is no need to increase the process temperature, enabling low-temperature polymerization and minimizing changes in the properties of the polymer solution.

The polymerization reaction using the oxidation-reduction reaction may actively take place even at a temperature near room temperature (25° C.) or less. For example, the polymerization reaction may be performed at a temperature of 5° C. to 25° C., or 5° C. to 20° C.

In an aspect of the present disclosure, when a persulfate-based initiator is used as the initiator, the reducing agent may be at least one selected from the group consisting of sodium metabisulfite ($Na_2S_2O_5$); tetramethyl ethylenediamine (TMEDA); a mixture ($FeSO_4$/EDTA) of iron (II) sulfate and EDTA; sodium formaldehyde sulfoxylate; and disodium 2-hydroxy-2-sulfinoacetate.

For example, potassium persulfate may be used as the initiator and disodium 2-hydroxy-2-sulfinoacetate may be used as the reducing agent; ammonium persulfate may be used as the initiator and tetramethyl ethylenediamine may be used as the reducing agent; or sodium persulfate may be used as the initiator and sodium formaldehyde sulfoxylate may be used as the reducing agent.

In another aspect of the present disclosure, when a hydrogen peroxide-based initiator is used as the initiator, the reducing agent may be at least one selected from the group consisting of ascorbic acid; sucrose; sodium sulfite ($Na_2SO_3$); sodium metabisulfite ($Na_2S_2O_5$); tetramethyl ethylenediamine (TMEDA); a mixture ($FeSO_4$/EDTA) of iron (II) sulfate and EDTA; sodium formaldehyde sulfoxylate; disodium 2-hydroxy-2-sulfinoacteate; and disodium 2-hydroxy-2-sulfoacteate.

The monomer composition may further include additives such as a thickener, a plasticizer, a preservative stabilizer, and an antioxidant, as needed.

In addition, the monomer composition including the monomer may be in a solution state dissolved in a solvent, for example, water, and the solid content in the monomer composition in the solution state, that is, the concentration of the monomer, the internal cross-linking agent, and the polymerization initiator may be appropriately adjusted in consideration of polymerization time and reaction conditions. For example, the solid content in the monomer composition may be 10 to 80 wt %, 15 to 60 wt %, or 30 to 50 wt %.

The solvent that may be used in this case may be one without limitation as long as it may dissolve the above-mentioned components, and for example, at least one selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, or N,N-dimethylacetamide may be used in combination.

The polymer obtained by the method may form a polymer having a high molecular weight and uniform molecular weight distribution through polymerization using an ethylenically unsaturated monomer in an un-neutralized state.

In addition, the polymer may have a moisture content of 30 to 80 wt %. For example, the moisture content of the polymer may be 30 wt % or greater, 45 wt % or greater, or 50 wt % or greater, and 80 wt % or less, 70 wt % or less, or 60 wt % or less.

When the moisture content of the polymer is too low, it may be difficult to secure an appropriate surface area in a subsequent pulverization step, and thus the polymer may not be effectively pulverized. When the moisture content of the polymer is too high, the pressure applied in a subsequent pulverization step may increase, making it difficult to pulverize to a desired particle size.

Meanwhile, throughout this specification, "moisture content" refers to the content of moisture with respect to the total polymer weight, which is a value obtained by subtracting the weight of the polymer in a dry state from the weight of the polymer. Specifically, the moisture content is defined as a value calculated by measuring weight loss caused by moisture evaporation in the polymer during the process of drying the polymer in a crumb state by raising the temperature through infrared heating. In this case, the drying condition involves raising the temperature from room temperature to about 180° C. and then maintaining the temperature at 180° C. and setting the total drying time to 40 minutes including a 5 minute temperature raising step, and the moisture content is measured.

The super absorbent polymer according to an aspect of the disclosure includes a base resin powder including a cross-linked polymer of a water-soluble ethylenically unsaturated monomer having an acidic group and/or a salt thereof and an internal cross-linking agent as described above; a surface cross-linked layer formed on the base resin powder by further cross-linking the cross-linked polymer through a surface cross-linking agent.

The surface cross-linked layer is formed on at least a portion of the surface of the base resin powder and may be formed by additionally cross-linking the cross-linked polymer included in the base resin powder via a surface cross-linking agent.

As the surface cross-linking agent, any surface cross-linking agent that has been used in the preparation of super absorbent polymers may be used without particular limitation. For example, the surface cross-linking agent may be at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, and glycerol; at least one carbonate compound selected from the group consisting of ethylene carbonate, propylene carbonate, and glycerol carbonate; an epoxy compound such as ethylene glycol diglycidyl ether; an oxazoline compound such as oxazolidinone; a polyamine compound; an oxazoline compound; a mono-, di-, or polyoxazolidinone compound; or a cyclic urea compound; or the like.

Specifically, one or more, two or more, or three or more of the surface cross-linking agents described above may be used as the surface cross-linking agent, for example, two types, propylene glycol and ethylene glycol diglycidyl ether, may be used, or ethylene carbonate-propylene carbonate (ECPC), propylene glycol, and/or glycerol carbonate may be used.

Such a surface cross-linking agent may be used in an amount of 0.001 to 0.5 parts by weight with respect to 100 parts by weight of the super absorbent polymer particles. In this case, 100 parts by weight of the super absorbent polymer particles are based on a dried state. In addition, the content means a total amount of the surface cross-linking agent used.

For example, the surface cross-linking agent may be used in an amount of 0.005 parts by weight or greater, 0.01 parts by weight or greater, or 0.05 parts by weight or greater with respect to the super absorbent polymer particles. In addition, the surface cross-linking agent may be used in an amount of 0.5 parts by weight or less, 0.4 parts by weight or less, or 0.2 parts by weight or less, with respect to 100 parts by weight of the super absorbent polymer particles. By adjusting the content range of the surface cross-linking agent to the above-described range, a super absorbent polymer exhibiting excellent overall absorption properties may be prepared.

In addition, the surface cross-linked layer may be formed by adding an inorganic material to the surface cross-linking agent. That is, in the presence of the surface cross-linking agent and the inorganic material, the surface of the base resin powder may be further cross-linked to form a surface cross-linked layer.

As the inorganic material, at least one inorganic material selected from the group consisting of silica, clay, alumina, silica-alumina composite, titania, zinc oxide, and aluminum sulfate may be used. The inorganic material may be used in powder form or liquid form. In addition, the inorganic material may be used in an amount of 0.001 parts by weight to 1 part by weight with respect to 100 parts by weight of the super absorbent polymer particles. In this case, 100 parts by weight of the super absorbent polymer particles are based on a dried state. In addition, the content means a total amount of the inorganic material used.

For example, the inorganic material may be used in an amount of 0.005 parts by weight or greater, 0.01 parts by weight or greater, or 0.05 parts by weight or greater, with respect to 100 parts by weight of the super absorbent polymer particles. In addition, the inorganic material may be used in an amount of 0.5 parts by weight or less, 0.4 parts by weight or less, or 0.2 parts by weight or less, with respect to 100 parts by weight of the super absorbent polymer particles. By adjusting the content range of the surface cross-linking agent to the above-described range, a super absorbent polymer exhibiting excellent overall absorption properties may be prepared.

When mixing the surface cross-linking agent and the base resin powder, water and methanol may be additionally mixed and added. The adding of water and methanol offers a benefit that the surface cross-linking agent may be evenly dispersed in the resin composition. In this case, the contents of the added water and methanol may be appropriately adjusted to induce even dispersion of the surface cross-linking agent, prevent aggregation of the resin composition, and optimize the surface penetration depth of the cross-linking agent.

In addition, when mixing the surface cross-linking agent and the base resin powder, a surfactant may be additionally mixed and added, and examples of the surfactant include sucrose stearate or the like. The surfactant may also serve to induce even dispersion of the surface cross-linking agent and prevent aggregation of the resin composition.

As described above, the super absorbent polymer including the base resin powder and the surface cross-linked layer formed on the base resin powder may absorb body fluid or water at a high rate, and may also absorb a relatively large amount initially, thereby preventing issues such as body fluid or water not being absorbed and accumulating or leaking out.

II. Preparation Method of Super Absorbent Polymer

Typical super absorbent polymers are prepared by cross-linking and polymerizing a water-soluble ethylenically unsaturated monomer having at least a partially neutralized acid group in the presence of an internal cross-linking agent and a polymerization initiator to form a hydrogel polymer, drying the hydrogel polymer formed in this manner, and then pulverizing to a desired particle size. In this case, a chopping process is usually performed to cut the hydrogel polymer into particles with several millimeters in size before the drying process to facilitate drying of the hydrogel polymer and increase the efficiency of the pulverizing process. However, due to the adhesiveness of the hydrogel polymer in this chopping process, the hydrogel polymer is not pulverized to a micro-sized particle level and becomes an aggregated gel. When this aggregated gel-shaped hydrogel polymer is dried, a plate-shaped dried product is formed, and in order to pulverize to a micro-sized particle level, a multi-stage pulverizing process is required to reduce the adhesiveness of the polymer, causing an issue of generating a lot of fine powders during this process.

To resolve this issue, a method of reusing the separated fine particles by mixing the fine particles with an appropriate amount of water and reassembling the fine particles and then adding the fine particles to the chopping step or pre-drying step has been used. However, issues such as increased device load and/or energy usage have occurred during the process of reusing the fine particles. In addition, the physical properties of the super absorbent polymer were degraded due to the fine particles that remain unclassified even after reuse.

To resolve this issue, as a result of repeated research, it was confirmed that, instead of performing polymerization in a state where the acid group of the water-soluble ethylenically unsaturated monomer is neutralized, as in the typical method for preparing a super absorbent polymer, polymerization is first performed in a state where the acid group is not neutralized to form a polymer, and then the hydrogel polymer is micronized in the presence of a surfactant and then the acid group of the polymer is neutralized, or the acid group of the polymer is neutralized to form a hydrogel polymer and then the hydrogel polymer is micronized in the presence of a surfactant, or the acid group present in the polymer is neutralized simultaneously with the micronization, so that the surfactant is present in a large amount on the surface of the polymer and may sufficiently serve to reduce the high adhesiveness of the polymer, preventing the polymer from excessively aggregating, and controlling the aggregation state to a desired level.

Meanwhile, the super absorbent polymer according to the present disclosure may be achieved by controlling the resin component and content, polymerization conditions, pulverization process conditions, and the like. For example, by controlling the type and content of the monomer composition in the polymerization process, the type and content of the internal cross-linking agent, the type, input amount and input timing of the surfactant in the neutralization and micronization steps, the type, input amount and input timing of the neutralizing agent, the type, rotation speed, and hole size of a micronization device, the number of micronizations, the components and content of the surface cross-linking solution, or the like, ratios of functional groups present on the surface of the super absorbent polymer may be controlled as in the present disclosure.

In particular, the ratio of functional groups present on the surface of the super absorbent polymer may be controlled as in the present disclosure by adjusting the amount of a neutralizing agent added in the neutralization step, applying a ultra-fine chain process as a micronization method, or adjusting the components and content of a surface cross-linking agent in the surface cross-linking step. The ultra-fine chain process and the adjusting of components and content of a surface cross-linking agent are described below.

Hereinafter, a method for preparing a super absorbent polymer according to an aspect is described in more detail for each step.

Step 1: Polymerization Step

First, polymerization is performed on a monomer composition containing a water-soluble ethylenically unsaturated monomer having an acid group and an internal cross-linking agent, thereby preparing a base resin powder containing a polymer in which the water-soluble ethylenically unsaturated monomer having an acid group and the internal cross-linking agent are cross-linked and polymerized.

The step may be composed of a step of preparing a monomer composition by mixing the water-soluble ethylenically unsaturated monomer having an acid group, an internal cross-linking agent, and a polymerization initiator, and a step of polymerizing the monomer composition to form a polymer.

In this case, descriptions in the super absorbent polymer of Section I above may all apply to each component.

However, according to an aspect of the present disclosure, polymerization is first performed in a state in which the acid groups of the water-soluble ethylenically unsaturated monomer are not neutralized to form a polymer.

A water-soluble ethylenically unsaturated monomer (e.g., acrylic acid) in which the acid groups are not neutralized, is in a liquid state at room temperature and has high miscibility with a solvent (water), and thus is present in a state of a mixed solution in a monomer composition. However, a water-soluble ethylenically unsaturated monomer in which the acid groups are neutralized, is in a solid state at room temperature and has different solubility depending on the temperature of the solvent (water), and the solubility decreases at a lower temperature.

As such, the water-soluble ethylenically unsaturated monomer in which the acid group is not neutralized has a higher solubility or miscibility in a solvent (water) than the monomer in which the acid group is neutralized, so that precipitation does not occur even at a low temperature, providing benefits for long-term polymerization at a low temperature. Accordingly, by performing long-term polymerization using the water-soluble ethylenically unsaturated monomer in which the acid group is not neutralized, a polymer having a higher molecular weight and uniform molecular weight distribution may be stably formed.

In addition, the formation of a polymer with a longer chain is achievable, and thus the effect of reducing the amount of extractable contents that are not cross-linked due to incomplete polymerization or cross-linking may be achieved, and accordingly, it is suitable to achieve the desired range for extractable contents as measured after free swelling in water having an electrical conductivity of 100 to 130 μS/cm for 1 hour, as described in the present disclosure.

In addition, when polymerization is first performed in a state where the acid group of the monomer is not neutralized to form a polymer, and then the polymer is micronized in the presence of a surfactant after neutralization or micronized in the presence of a surfactant and then neutralized, or the acid group present in the polymer is neutralized simultaneously with the micronization, the surfactant may be present in a large amount on the surface of the polymer, and thus sufficiently serve to reduce the adhesiveness of the polymer.

According to an aspect of the present disclosure, the performing of polymerization on the monomer composition to form a polymer may be performed in a batch type reactor for 1 hour or more.

In a typical method for preparing a super absorbent polymer, the polymerization method is largely divided into thermal polymerization and photopolymerization depending on the polymerization energy source. When thermal polymerization is performed, the polymerization may be performed in a reactor having a stirring shaft such as a kneader, and when photopolymerization is performed, the polymerization may be performed in a flat-bottomed container.

Meanwhile, when the polymerization is performed as a continuous polymerization, for example, when the polymerization is performed in a reactor having a stirring shaft and equipped with a conveyor belt, a new monomer composition is supplied to the reactor as the polymerization resultant moves, so that the polymerization is performed continuously, and thus, polymers with different polymerization rates are mixed, and accordingly, it is difficult to achieve even polymerization throughout the monomer composition, which may result in a degradation of overall physical properties.

However, according to an aspect of the present disclosure, since the polymerization is performed in a stationary manner in a batch reactor, there is less concern that polymers with different polymerization rates may be mixed, and accordingly, a polymer with even quality may be obtained.

In addition, the polymerization step is performed in a batch reactor having a predetermined volume, and the polymerization reaction is performed for a longer period of time, for example, 1 hour or more, 3 hours or more, or 6 hours or more, than when the polymerization is performed continuously in a reactor equipped with a conveyor belt. Despite the long polymerization reaction time as described above, since polymerization is performed on a water-soluble ethylenically unsaturated monomer in an un-neutralized state, the monomer is not easily precipitated even when polymerization is performed for a long time, which provides benefits for long-term polymerization.

Meanwhile, since polymerization in the batch reactor of the present disclosure uses a thermal polymerization method, the polymerization initiator uses a thermal polymerization initiator, and the description of the corresponding component is as described above.

Steps 2 and 3: Micronization and Neutralization Steps

Next, a step (step 2) for preparing a mixture containing micronized hydrogel polymer by micronizing the hydrogel polymer in the presence of a surfactant is included.

The micronization step is a step for micronizing the polymer in the presence of a surfactant and is a step in which micronization and aggregation into a size of tens to hundreds of micrometers are simultaneously performed, rather than chopping the polymer into a size of millimeters.

That is, the step is for preparing secondary aggregated particles in the form of aggregates of primary particles micronized into a size of tens to hundreds of micrometers by imparting appropriate adhesiveness to the polymer. The secondary aggregated particles, hydrogel super absorbent polymer particles, prepared by this step have normal particle size distribution and a greatly increased surface area, so that the absorption rate may be significantly improved.

Meanwhile, in the micronization step, when a high-intensity mechanical shear force is applied and the polymer is ultra-finely pulverized at a rotation speed of 500 rpm to 4,000 rpm, aggregated hydrogel particles having finer pores may be formed.

In this case, when the polymer is ultra-finely pulverized at a rotation speed of 500 rpm to 4,000 rpm, since a high-intensity mechanical shear force is applied, fine pores of 100 μm or less are easily formed in the polymer, thereby increasing surface roughness, and a total surface area of the polymer is significantly increased by the pores formed inside and outside the polymer particles. Since the fine pores are formed in a stable form compared to pores formed using a foaming agent in the polymerization step, the degree of fine powder generation by the pores may be significantly reduced in the subsequent process. The super absorbent polymer particles prepared by the steps may have a significantly increased surface area, so that the absorption rate may be significantly improved, and accordingly, it is suitable to achieve the desired range for extractable contents as measured after free swelling in water having an electrical conductivity of 100 to 130 μS/cm for 1 hour, as described in the present disclosure.

The ultra-fine pulverization process is performed at a rotation speed of 500 rpm to 4,000 rpm. When the rotation speed of the process is less than 500 rpm, it is difficult to form sufficient pores to the desired degree, and thus it is difficult to expect a fast absorption rate and to secure the desired level of productivity. In addition, when the speed exceeds 4,000 rpm, a polymer chain may be damaged due to excessive shear force, and accordingly, extractable contents may increase, and thus the overall physical properties of the prepared super absorbent polymer may be slightly degraded. Preferably, the ultra-fine pulverization process may be performed at a range of 1,000 rpm to 3,500 rpm, or 2,000 rpm to 3,000 rpm. In this range, the desired micropore formation is easily achieved without the issues described above.

According to an aspect of the present disclosure, the micronization step is performed by a micronization device, and the micronization device may include a body portion including a transport space in which a polymer is transported therein; a screw member rotatably installed inside the transport space to move the polymer; a driving motor providing a rotational driving force to the screw member; a cutter member installed in the body portion to pulverize the polymer; and a porous plate having a plurality of holes formed therein for discharging the polymer pulverized by the cutter member to the outside of the body portion.

In this case, the hole size provided in the porous plate of the micronization device may be 1 mm to 25 mm, 5 mm to 20 mm, or 5 mm to 15 mm.

As such, when the polymer mixed with the surfactant is micronized while controlling aggregation using a micronization device, smaller particle size distribution is realized, and thus subsequent drying and pulverizing processes may be performed under milder conditions, thereby preventing fine dust generation and improving the properties of the super absorbent polymer. In addition, when ultra-fine pulverization is performed, appropriate micropores are simultaneously formed on the surface of the polymer, thereby improving the absorption rate through an increase in surface area.

The micronization step may be performed once or more times, and preferably once to six times, or once to four times, or once to three times. The micronization step may be performed using a plurality of micronizing devices, or may be performed using a single micronizing device including a plurality of porous plates and/or a plurality of cutter members, or among the plurality of micronizing devices, some devices may include a plurality of porous plates and/or a plurality of cutter members.

According to an aspect of the present disclosure, a surfactant may be additionally used in the micronization step, and thus, aggregation between polymer particles is effectively controlled, thereby reducing load on the device used in the pulverization process and further improving productivity.

The surfactant may be selected from compounds represented by Formulas 2-1 to 2-14, but is not limited thereto:

[Formula 2-1]

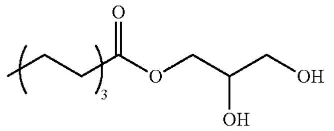

[Formula 2-2]

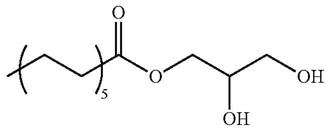

[Formula 2-3]

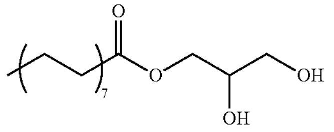

[Formula 2-4]

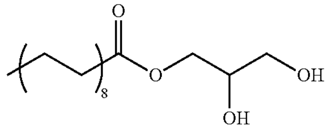

-continued

[Formula 2-5]

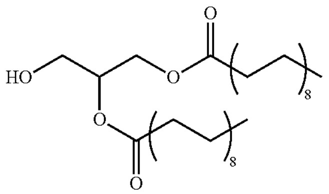

[Formula 2-6]

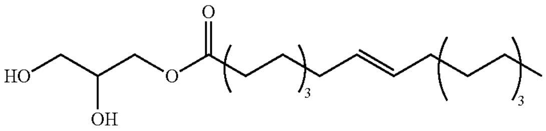

[Formula 2-7]

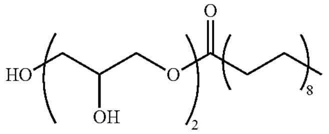

[Formula 2-8]

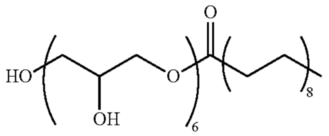

[Formula 2-9]

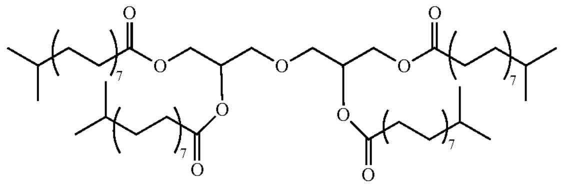

[Formula 2-10]

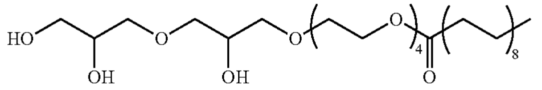

[Formula 2-11]

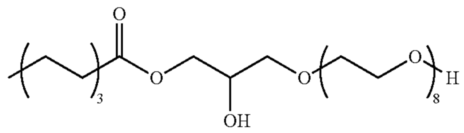

[Formula 2-12]

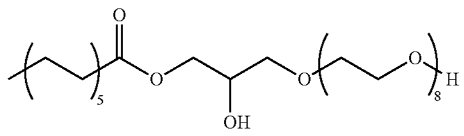

[Formula 2-13]

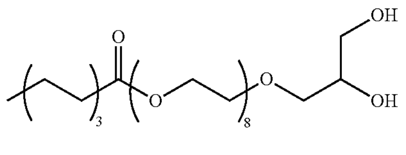

-continued

[Formula 2-14]

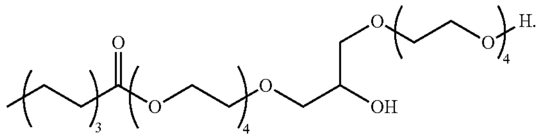

According to an aspect of the present disclosure, the surfactant may be glycerol monolaurate (GML), but is not limited thereto.

Meanwhile, the amount of the surfactant used is not particularly limited but may be 0.06 g to 0.48 g per 1,000 g of the hydrogel polymer depending on the productivity or the device load status.

When the surfactant is used too little, the surfactant may not be evenly adsorbed on the polymer surface, causing re-aggregation of particles after pulverization, or absorption performance such as centrifuge retention capacity and absorbency under pressure may be degraded due to the surfactant sharing a lot with the polymer. Meanwhile, when the surfactant is used too much, the overall physical properties of a finally prepared super absorbent polymer may be degraded due to a decrease in surface tension.

Therefore, for example, the surfactant may be used in an amount of 0.06 g or greater, 0.1 g or greater, or 0.2 g or greater, but 0.48 g or less, 0.45 g or less, or 0.4 g or less per 1,000 g of the hydrogel polymer, and accordingly, it is easy to achieve the desired range for extractable contents as measured after free swelling in water having an electrical conductivity of 100 to 130 μS/cm for 1 hour, as described in the present disclosure.

The method of mixing the surfactant into the polymer is not particularly limited as long as it is a method that may evenly mix into the polymer and may be appropriately adopted and used. Specifically, the surfactant may be mixed in a dry manner, mixed in a solution state after dissolving in a solvent, or mixed after melting the surfactant.

For example, the surfactant may be mixed in a solution state dissolved in a solvent. In this case, any type of solvent may be used without limitation, including inorganic or organic solvents, but water is most appropriate when considering the ease of the drying process and the cost of a solvent recovery system. In addition, the solution may be used by mixing the surfactant and the polymer in a reaction tank, adding the polymer to a mixer and spraying the solution, or continuously supplying the polymer and the solution to a continuously operating mixer and mixing the two.

Meanwhile, when the surfactant is mixed in a solution state dissolved in water, the surfactant may be used by diluting with an aqueous solution having a concentration of about 0.01% to 10%.

For example, when the surfactant is to be used at 0.1 g per 1,000 g of the hydrogel polymer, 100 g of an aqueous solution having a concentration of 0.1% in which 0.1 g of the surfactant is dissolved in 99.9 g of water may be used. Alternatively, 10 g of an aqueous solution having a concentration of 1% in which 0.1 g of the surfactant is dissolved in 9.9 g of water may be used.

That is, when the same amount of surfactant is used, the water content may be increased or decreased to use an aqueous solution having a desired concentration, and the concentration may be appropriately adjusted in consideration of the physical properties of the super absorbent polymer to be finally prepared.

Meanwhile, when the surfactant is hydrophobic and has very low solubility in water, the surfactant may be dry mixed with the polymer, or added and dispersed in water for use. For example, when the surfactant is dry mixed in powder form and dispersed in the polymer, dispersion degree is very poor. Therefore, the surfactant may be dispersed in water and evenly applied onto the surface for use.

According to an aspect of the disclosure, a step (step 3) of neutralizing at least a portion of the acidic groups of the polymer is performed, and the micronization step of step 2 and the neutralization step of step 3 described above may be performed sequentially, alternately, or simultaneously.

That is, a neutralizing agent may be added to the polymer to neutralize the acidic group first, and then a surfactant may be added to the neutralized polymer to micronize the polymer mixed with the surfactant (performed in the order of step 3→step 2), or the neutralizing agent and the surfactant may be added to the polymer simultaneously to perform neutralization and micronization of the polymer (perform steps 2 and 3 simultaneously). Alternatively, the surfactant may be added first, and the neutralizing agent may be added later (performed in the order of step 2→step 3). Alternatively, the neutralizing agent and the surfactant may be alternately added in an alternation manner. Alternatively, the surfactant may be injected first to micronize, the neutralizing agent may be injected to neutralize, and the surfactant may be additionally injected into the neutralized hydrogel polymer to perform an additional micronization process.

In this case, when the neutralization step is performed independently from the micronization step of step 2, the process may be performed in a manner in which the polymer is pulverized while the additive is simultaneously injected. More specifically, a screw-type extruder including a porous plate having a plurality of holes formed therein may be used. The screw-type extruder is a device that performs pulverization under mild conditions compared to the micronization device used in the micronization step described above, and the rotation speed may be about 150 rpm to 500 rpm, and the holes of the porous plate may be about 3 mm to 25 mm, but are not limited thereto.

The rotation speed of the screw-type extruder and the size of the holes of the porous plate affect the discharge state of the super absorbent polymer discharged from the extruder, and the particle shape of the super absorbent polymer may change depending on the discharge state.

In particular, by controlling the rotation speed of the screw-type extruder to 150 rpm to 500 rpm, extractable contents as measured after free swelling in water having an electrical conductivity of 100 to 130 μS/cm for 1 hour, as described in the present disclosure, may be controlled to the desired range.

In this case, a basic material such as sodium hydroxide, potassium hydroxide, or ammonium hydroxide that may neutralize acid groups may be used as the neutralizing agent.

In addition, the degree of neutralization, which refers to the degree of neutralization of acid groups included in the polymer by the neutralizing agent, may be 50 to 90 mol %, 60 to 85 mol %, 65 to 85 mol %, or 65 to 80 mol %. The range of the degree of neutralization may vary depending on the final physical properties, and the absorption speed and absorption performance may be controlled by controlling the degree of neutralization.

In this case, when the degree of neutralization is too high, the absorption capacity of the super absorbent polymer may decrease, and when the concentration of carboxyl groups on the particle surface is too low, it is difficult to properly perform surface cross-linking in the subsequent process, which may decrease characteristics of absorbency under pressure or liquid permeability. Conversely, when the degree of neutralization is too low, the absorption capacity of the polymer may decrease significantly, and properties like elastic rubber that are difficult to handle may be shown.

Meanwhile, in order to evenly neutralize the entire polymer, it may be desirable to leave a certain amount of time between the injection of the neutralizing agent and the micronization process.

Step 4: Drying Step

Next, a step (step 4) of drying the micronized and neutralized polymer to prepare a base resin powder is performed.

The step is a step of drying the moisture of the base resin powder which is a polymer obtained by neutralizing at least a portion of the acid groups of the polymer and micronizing the polymer.

In the typical method for preparing a super absorbent polymer, the drying step is performed so that the moisture content of the base resin powder becomes about 4 to 20 wt %, about 4 to 15 wt %, or about 6 to 13 wt %. However, the present disclosure is not limited thereto.

Step 4 may be performed in a fixed-bed type drying manner, a moving type drying manner, or a combination thereof.

According to an aspect of the disclosure, step 4 may be performed in a fixed-bed type drying manner.

The static drying refers to a method in which a material to be dried is stopped on a porous iron plate that allows air to pass through, and the material is dried by having hot air flow from bottom to top.

Since the static drying involves drying in a plate-like shape without particle movement, it is difficult to perform uniform drying with a simple flow of hot air. Therefore, the static drying requires delicate control of hot air and temperature to obtain a uniform dried product with a high moisture content. In the present disclosure, the method of changing hot air from bottom to top prevents the plate-like dried product from bending during drying, thereby preventing the hot air from leaking out. In addition, the drying temperature is changed by section, and thus top, bottom, left, right, and internal upper, middle, and lower layers of the dried product may be uniformly dried with a moisture content deviation of less than 5%.

As a device capable of drying through a static drying method, a belt-type dryer or the like may be used, but is not limited thereto.

In the case of the static drying step, the drying process may be performed at a temperature of about 80° C. to 200° C., or preferably 90° C. to 190° C. or 100° C. to 180° C. When the drying temperature is less than 80° C., the drying time may be excessively long, and when the drying temperature is excessively high, exceeding 200° C., a super absorbent polymer having a moisture content lower than the desired moisture content may be obtained. Meanwhile, the drying temperature may refer to the temperature of hot air used or may refer to the internal temperature of a device during the drying process.

According to an aspect of the disclosure, step 4 may be performed by fluid drying.

The fluid drying refers to a method of drying while mechanically stirring a dried product during drying. In this case, a direction in which hot air passes through a material may be the same as or different from a circulation direction of the material. Alternatively, the material may be circulated inside a dryer, and heat-release fluid (heat-release oil) may be passed through a separate pipe outside the dryer to dry the material.

As a device capable of drying through this fluid drying method, a horizontal-type mixer, a rotary kiln, a paddle dryer, a steam tube dryer, or a generally used fluid dryer may be used.

In the case of the fluid drying step, the drying process may be performed at a temperature of about 100° C. to 300° C., or preferably 120° C. to 280° C. or 150° C. to 250° C. When the drying temperature is too low, less than 100° C., the drying time may be too long, and when the drying temperature is too high, exceeding 300° C., a polymer chain of the super absorbent polymer may be damaged, which may result in a decrease in overall physical properties, and a super absorbent polymer having a moisture content lower than the desired moisture content may be obtained.

Step 5: Pulverization Step

Next, a step of pulverizing the dried base resin powder is performed.

Specifically, the pulverization step may be performed to pulverize the dried base resin powder to a particle size of a normal particle level, that is, a particle size of 150 μm to 850 μm.

The pulverizer used for this purpose may specifically be a vertical pulverizer, a turbo cutter, a turbo grinder, a rotary cutter mill, a cutter mill, a disc mill, a shred crusher, a crusher, a chopper, or a disc cutter, and is not limited to the examples described above.

Alternatively, a pin mill, a hammer mill, a screw mill, a roll mill, a disc mill, or a jog mill may be used as a pulverizer but the pulverizer is not limited to the examples described above.

Meanwhile, in the preparation method of the present disclosure, super absorbent polymer particles having smaller particle size distribution than those in the typical chopping step may be realized in the micronization step, and since the moisture content after drying is maintained relatively high, even when pulverization is performed under mild conditions with a less pulverizing force, a super absorbent polymer having a very high content of normal particle size of 150 μm to 850 μm may be formed, and the fine powder generation ratio may be greatly reduced.

The super absorbent polymer particles prepared as described above may contain super absorbent polymer particles, i.e., normal particles, having a particle diameter of 150 μm to 850 μm, in an amount of 80 wt % or greater, 85 wt % or greater, 89 wt % or greater, 90 wt % or greater, 92 wt % or greater, 93 wt % or greater, 94 wt % or greater, or 95 wt % or greater, with respect to a total weight. The particle diameter of the polymer particles may be measured according to a method of European Disposables and Nonwovens Association (EDANA) standard EDANA WSP 220.3.

In addition, the super absorbent polymer particles may include fine particles having a particle diameter of less than 150 μm in an amount of about 20 wt % or less, about 18 wt % or less, about 15 wt % or less, about 13 wt % or less, about 12 wt % or less, about 111 wt % or less, about 10 wt % or less, about 9 wt % or less, about 8 wt % or less, or about 5 wt % or less, with respect to a total weight. This is in contrast to a case where a super absorbent polymer is prepared using the typical preparation method and has a fine particle content of greater than about 20 wt % to about 30 wt %.

Additive Injection Step

Meanwhile, according to an aspect of the disclosure, a step of adding an additive to the micronized and neutralized polymer before the drying step (step 4) may be further included.

The additive injection process is a process for improving physical properties by using an additional additive within a range that does not hinder the desired effect, and the type of the additive is not particularly limited. The examples thereof include a polymerization initiator for removing residual monomers, a permeability improving agent for improving absorption properties, a fine powder for recycling generated fine powders, an anti-caking agent, a fluidity improving agent, an antioxidant, a neutralizing agent, a surfactant, and the like, but are not limited thereto.

The additive injection step may be performed simultaneously with step 2, simultaneously with step 3, after steps 2 and 3, or in at least one of these steps. The additive injection step may be performed multiple times as needed and may also be performed at least once in each step.

When the additive injection step is performed independently from steps 2 and 3, that is, after steps 2 and 3 and before step 4, it may be performed in a manner in which the additive is injected while pulverizing the polymer.

The pulverization may typically be performed using the same pulverization step as step 5 described above, and the additive may be injected once or multiple times in the pulverization step and mixed with the polymer.

Classification Step

Next, after the step of pulverizing the base resin powder (step 5), a step of classifying the pulverized super absorbent polymer particles according to particle diameters may be further included.

Step 6: Surface Cross-Linking Step

In addition, after pulverizing (step 5) and/or classifying the base resin powder, a step of forming a surface cross-linked layer on at least a portion of the surface of the base resin particles in the presence of a surface cross-linking agent may be further included. By the step, the cross-linked polymer contained in the base resin powder may be further cross-linked via the surface cross-linking agent, and thus a surface cross-linked layer may be formed on at least a portion of the surface of the base resin powder.

The descriptions above may all apply to the surface cross-linking agent. In addition, the descriptions above may all apply to water, methanol, and surfactant added when mixing the surface cross-linking agent and the base resin powder.

In addition, there is no limitation on the configuration of the method of mixing the surface cross-linking agent with the base resin powder. For example, a method of mixing a composition including a surface cross-linking agent and a base resin powder in a reaction tank, a method of spraying a surface cross-linking agent onto a composition, a method of continuously supplying a resin composition and a surface cross-linking agent to a continuously operated mixer, or the like may be used.

The surface cross-linking process may be performed at a temperature of about 80° C. to about 250° C. More specifically, the surface cross-linking process may be performed at a temperature of about 100° C. to about 220° C., or about 120° C. to about 200° C. for about 20 minutes to about 2 hours, or about 40 minutes to about 80 minutes. When the surface cross-linking process conditions are satisfied, the surface of the super absorbent polymer particles may be sufficiently cross-linked, thereby increasing absorbency under pressure.

The temperature increasing means for the surface cross-linking reaction is not particularly limited.

Heating may be performed by supplying a heat medium or directly supplying a heat source. In this case, the type of heat medium that may be used includes heated fluids such as steam, hot air, and hot oil, but is not limited thereto, and the temperature of the supplied heat medium may be appropriately selected in consideration of the means of the heat medium, the heating rate, and the target temperature of heating. Meanwhile, the directly supplied heat source may be heating through electricity and heating through gas, but is not limited to the examples described above.

Post-Processing Step

According to an aspect of the present disclosure, after the step of forming a surface cross-linked layer on at least a portion of the surface of the base resin powder, at least one of a cooling step of cooling the super absorbent polymer particles on which the surface cross-linked layer is formed, a watering step of adding water to the super absorbent polymer particles on which the surface cross-linked layer is formed, and a post-processing step of adding an additive to the super absorbent polymer particles on which the surface cross-linked layer is formed, may be further performed. In this case, the cooling step, the watering step, and the post-processing step may be performed sequentially or simultaneously.

Water or saline solution may be used in the watering step, and the amount of generation of a slurry, etc. may be controlled therethrough. The amount of water used may be appropriately adjusted in consideration of the moisture content of an intended final product, and preferably, 0.1 to 10 wt %, 0.5 to 8 wt %, or 1 to 5 wt %, with respect to the absorbent polymer may be used but the amount is not limited thereto.

In addition, a maturing step may be further performed after the watering step.

In the watering step, when using saline solution, the solution absorption rate is relatively low due to the conductivity of the saline solution, and thus the saline solution is evenly distributed in the maturation step, enabling even absorption of the absorbent polymer. A commonly used method may apply to the maturation step without any special limitation, and for example, the maturation step may be performed at 100° C. or less, 80° C. or less, or preferably 50° C. or less for 10 minutes to 1 hour using a rotary stirring device.

The additives added in the post-processing step may be a surfactant, an inorganic salt, a permeability enhancer, an anti-caking agent, a fluidity enhancer, or an antioxidant, but the present disclosure is not limited thereto.

By selectively performing the cooling step, watering step, and post-processing step, the moisture content of the final super absorbent polymer may be improved by controlling the occurrence of slurry, etc., and a super absorbent polymer product with better quality may be prepared.

Hereinafter, the operation and effect of the disclosure are described in more detail through particular examples of the disclosure. However, the examples are merely presented as examples of the disclosure, and the scope of the disclosure is not determined by the examples.

EXAMPLES

1) Example 1

(Step 1: Polymerization Step—Hydrogel Polymer Preparation Step)

In a 2 L glass vessel equipped with a stirrer and a thermometer, 1,000 g of acrylic acid, 2.5 g of pentaerythritol triallyl ether (PETTAE) as an internal cross-linking agent, and 2,260 g of water were stirred and mixed. In this case, the reaction temperature was maintained at 5° C. 1,000 cc/min of nitrogen was introduced into the glass vessel containing the mixture for 1 hour to replace the inside of the glass vessel with nitrogen conditions. Thereafter, 13.0 g of a 0.3% hydrogen peroxide aqueous solution, 15.0 g of a 1% ascorbic acid aqueous solution, and 30.0 g of a 2% 2,2'-azobis amidinopropane dihydrochloride aqueous solution were introduced as polymerization initiators. At the same time, 15.0 g of a 0.01% iron sulfate aqueous solution as a reducing agent was added and mixed to initiate polymerization. In the mixture, a polymerization reaction was initiated, and after the temperature of the polymer reached 85° C., the polymerization was performed in an oven at 90±2° C. for about 6 hours to prepare a hydrogel polymer.

(Steps 2 and 3: Micronization and Neutralization Steps)

1,000 g of the hydrogel polymer obtained in Step 1 and 0.1 g of glycerol monolaurate (GML) were dissolved in water at 60° C. or higher and introduced into a cylindrical pulverizer in the form of an aqueous solution. Thereafter, the mixture was pushed out through a porous plate having a plurality of 10 mm holes at a rotation speed of 1,500 rpm using a high-speed rotary chopper (F-150/Karl Schnell) installed inside the cylindrical pulverizer. Subsequently, the aqueous solution was further pushed out at a rotation speed of 2,600 rpm through a porous plate having a plurality of 10 mm holes formed therein to obtain a hydrogel polymer in the form of a pulverized gel. Thereafter, the pulverized gel-type hydrogel polymer was pushed out three times through a porous plate having a plurality of 6 mm holes at a rotation speed of 250 rpm super absorbent polymer particles.

In this case, 475 g of a 32% NaOH aqueous solution was added for the first pass through the porous plate, and 42.8 g of a 0.5% $Na_2S_{208}$ aqueous solution (SPS aqueous solution) was added for the second pass and pushed out through the porous plate. For the third pass, no additives were added, and the polymer was passed through the porous plate.

(Step 4: Drying Step)

The hydrous super absorbent polymer particles obtained as a result of the pulverization were placed on a porous plate capable of vertically transferring airflow and dried at 120° C. for 40 minutes using an air-flow oven.

Hot air of 200° C. and hot air of 100° C. were sequentially flowed from top to bottom for 5 minutes and 10 minutes, respectively, so that the dried super absorbent polymer had a moisture content of about 10%, and then hot air of 100° C. was flowed from bottom to top for 15 minutes to uniformly dry the hydrous super absorbent polymer particles and obtain a dried product.

(Step 5: Pulverization and Classification Steps)

The dried product was pulverized with a pulverizer (GRAN-U-LIZER™, MPE) and then classified with a standard mesh sieve of ASTM standards to obtain a base resin powder having a size of 150 to 850 μm.

(Step 6: Surface Cross-Linking Step)

Next, as described in Table 1 below, for 100 g of the base resin powder, a surface cross-linking agent aqueous solution containing 4 g of water, 6 g of methanol, 0.08 g of ethylene glycol diglycidyl ether (EJ-1030S), 0.1 g of propylene glycol, 0.2 g of aluminum sulfate, and 0.1 g of silica particles (Aerosil 200) was added and mixed. In this case, the surface cross-linking agent aqueous solution was mixed so as to be evenly distributed on the super absorbent polymer powder.

Subsequently, the base resin powder mixed with the surface cross-linking solution was placed in a surface cross-linking reactor and a surface cross-linking reaction was performed to obtain a surface cross-linked super absorbent polymer.

Specifically, in the surface cross-linking reactor, the base resin powder underwent a surface cross-linking reaction at 140° C. for 50 minutes.

After the surface cross-linking step, the surface-cross-linked super absorbent polymer was classified through a standard mesh sieve according to ASTM standards to prepare a super absorbent polymer having a particle size of 150 μm to 850 μm.

2) Example 2

(Step 1: Polymerization Step—Hydrogel Polymer Preparation Step)

A hydrogel polymer was prepared in the same manner as in Example 1.

(Steps 2 and 3: Micronization and Neutralization Steps)

Hydrous super absorbent polymer particles were obtained in the same manner as in Example 1 except that 410 g of a 32% NaOH aqueous solution was added instead of 475 g of a 32% NaOH aqueous solution when passing through the porous plate once in Example 1.

(Step 4: Drying Step)

The hydrous super absorbent polymer particles were uniformly dried in the same manner as in Example 1 to obtain a dried product.

(Step 5: Pulverization and Classification Steps)

The dried product was pulverized with a pulverizer (GRAN-U-LIZER™, MPE) and then classified with a standard mesh sieve of ASTM standards to obtain a base resin powder having a size of 150 to 850 μm.

(Step 6: Surface Cross-Linking Step)

The surface cross-linking step was performed in the same manner as in Example 1, except that the components and contents of the surface cross-linking agent aqueous solution were prepared as described in Table 1 below, to prepare a super absorbent polymer of Example 2.

3) Example 3

(Step 1: Polymerization Step—Hydrogel Polymer Preparation Step)

A hydrogel polymer was prepared in the same manner as in Example 1.

(Steps 2 and 3: Micronization and Neutralization Steps)

Hydrous super absorbent polymer particles were obtained in the same manner as in Example 1 except that 400 g of a 32% NaOH aqueous solution was added instead of 475 g of a 32% NaOH aqueous solution when passing through the porous plate once in Example 1.

(Step 4: Drying Step)

The hydrous super absorbent polymer particles were uniformly dried in the same manner as in Example 1 to obtain a dried product.

(Step 5: Pulverization and Classification Steps)

The dried product was pulverized with a pulverizer (GRAN-U-LIZER™, MPE) and then classified with a standard mesh sieve of ASTM standards to obtain a base resin powder having a size of 150 to 850 μm.

(Step 6: Surface Cross-Linking Step)

The surface cross-linking step was performed in the same manner as in Example 1, except that the components and contents of the surface cross-linking agent aqueous solution were prepared as described in Table 1 below, to prepare a super absorbent polymer of Example 3.

4) Example 4

(Step 1: Polymerization Step—Hydrogel Polymer Preparation Step)

A hydrogel polymer was prepared in the same manner as in Example 1.

(Steps 2 and 3: Micronization and Neutralization Steps)

1,000 g of the hydrogel polymer obtained in Step 1 and 0.1 g of glycerol monolaurate (GML) were dissolved in water at 60° C. or higher and introduced into a cylindrical pulverizer in the form of an aqueous solution. Thereafter, the mixture was pushed out through a porous plate having a plurality of 10 mm holes at a rotation speed of 1,200 rpm using a high-speed rotary chopper (F-150/Karl Schnell) installed inside the cylindrical pulverizer. Then, the pulverized gel-shaped hydrogel polymer was additionally pushed out through a porous plate having a plurality of 10 mm holes at a rotation speed of 2,500 rpm to obtain a pulverized gel-shaped hydrogel polymer. Thereafter, the pulverized gel-type hydrogel polymer was pushed out three times through a porous plate having a plurality of 6 mm holes at a rotation speed of 250 rpm super absorbent polymer particles.

In this case, 350 g of a 32% NaOH aqueous solution was added for the first pass through the porous plate, and 42.8 g of a 0.5% $Na_2S_{208}$ aqueous solution (SPS aqueous solution) was added for the second pass and pushed out through the porous plate. For the third pass, no additives were added, and the polymer was passed through the porous plate.

(Step 4: Drying Step)

The hydrous super absorbent polymer particles were uniformly dried in the same manner as in Example 1 to obtain a dried product.

(Step 5: Pulverization and Classification Steps)

The dried product was pulverized with a pulverizer (GRAN-U-LIZER™, MPE) and then classified with a standard mesh sieve of ASTM standards to obtain a base resin powder having a size of 150 to 850 μm.

(Step 6: Surface Cross-Linking Step)

The surface cross-linking step was performed in the same manner as in Example 1, except that the components and contents of the surface cross-linking agent aqueous solution were prepared as described in Table 1 below, to prepare a super absorbent polymer of Example 4.

5) Comparative Example 1

(Step 1: Polymerization Step—Hydrogel Polymer Preparation Step)

A hydrogel polymer was prepared in the same manner as in Example 1.

(Steps 2 and 3: Micronization and Neutralization Steps)

Hydrous super absorbent polymer particles were obtained in the same manner as in Example 1 except that 300 g of a 32% NaOH aqueous solution was added instead of 475 g of a 32% NaOH aqueous solution when passing through the porous plate once in Example 1.

(Step 4: Drying Step)

The hydrous super absorbent polymer particles were uniformly dried in the same manner as in Example 1 to obtain a dried product.

(Step 5: Pulverization and Classification Steps)

The dried product was pulverized with a pulverizer (GRAN-U-LIZER™, MPE) and then classified with a standard mesh sieve of ASTM standards to obtain a base resin powder having a size of 150 to 850 μm.

(Step 6: Surface Cross-Linking Step)

The surface cross-linking step was performed in the same manner as in Example 1 except that the components and contents of the surface cross-linking agent aqueous solution were prepared as described in Table 1 below, to prepare a super absorbent polymer of Comparative Example 1.

6) Comparative Example 2

(Step 1: Polymerization Step—Hydrogel Polymer Preparation Step)

A hydrogel polymer was prepared in the same manner as in Example 1.

(Steps 2 and 3: Micronization and Neutralization Steps)

1,000 g of the hydrogel polymer obtained in Step 1 and 0.1 g of glycerol monolaurate (GML) were dissolved in water at 60° C. or higher and introduced into a cylindrical pulverizer in the form of an aqueous solution. Thereafter, the mixture was pushed out through a porous plate having a plurality of 10 mm holes at a rotation speed of 1,600 rpm using a high-speed rotary chopper (F-150/Karl Schnell) installed inside the cylindrical pulverizer. Then, the pulverized gel-shaped hydrogel polymer was additionally pushed out through a porous plate having a plurality of 10 mm holes at a rotation speed of 2,800 rpm to obtain a pulverized gel-shaped hydrogel polymer. Thereafter, the pulverized gel-type hydrogel polymer was pushed out three times through a porous plate having a plurality of 6 mm holes at a rotation speed of 250 rpm using a screw-type extruder mounted inside a cylindrical pulverizer to obtain hydrous super absorbent polymer particles.

In this case, 330 g of a 32% NaOH aqueous solution was added for the first pass through the porous plate, and 42.8 g of a 0.5% $Na_2S_{208}$ aqueous solution (SPS aqueous solution) was added for the second pass and pushed out through the porous plate. For the third pass, no additives were added, and the polymer was passed through the porous plate.

(Step 4: Drying Step)

The hydrous super absorbent polymer particles were uniformly dried in the same manner as in Example 1 to obtain a dried product.

(Step 5: Pulverization and Classification Steps)

The dried product was pulverized with a pulverizer (GRAN-U-LIZER™, MPE) and then classified with a standard mesh sieve of ASTM standards to obtain a base resin powder having a size of 150 to 850 μm.

(Step 6: Surface Cross-Linking Step)

The surface cross-linking step was performed in the same manner as in Example 1 except that the components and contents of the surface cross-linking agent aqueous solution were prepared as described in Table 1 below, to prepare a super absorbent polymer of Comparative Example 2.

7) Comparative Example 3

(Step 1: Polymerization Step—Hydrogel Polymer Preparation Step)

A hydrogel polymer was prepared in the same manner as in Example 1.

(Steps 2 and 3: Micronization and Neutralization Steps)

1,000 g of the hydrogel polymer obtained in Step 1 and 0.1 g of glycerol monolaurate (GML) were dissolved in water at 60° C. or higher and introduced into a cylindrical pulverizer in the form of an aqueous solution. Thereafter, the mixture was pushed out through a porous plate having a plurality of 10 mm holes at a rotation speed of 1,600 rpm using a high-speed rotary chopper (F-150/Karl Schnell) installed inside the cylindrical pulverizer. Then, the pulverized gel-shaped hydrogel polymer was additionally pushed out through a porous plate having a plurality of 10 mm holes at a rotation speed of 2,800 rpm to obtain a pulverized gel-shaped hydrogel polymer. Thereafter, the pulverized gel-type hydrogel polymer was pushed out three times through a porous plate having a plurality of 6 mm holes at a rotation speed of 250 rpm using a screw-type extruder mounted inside a cylindrical pulverizer to obtain hydrous super absorbent polymer particles.

In this case, 340 g of a 32% NaOH aqueous solution was added for the first pass through the porous plate, and 42.8 g of a 0.5% $Na_2S_{208}$ aqueous solution (SPS aqueous solution) was added for the second pass and pushed out through the porous plate. For the third pass, no additives were added, and the polymer was passed through the porous plate.

(Step 4: Drying Step)

The hydrous super absorbent polymer particles were uniformly dried in the same manner as in Example 1 to obtain a dried product.

(Step 5: Pulverization and Classification Steps)

The dried product was pulverized with a pulverizer (GRAN-U-LIZER™, MPE) and then classified with a standard mesh sieve of ASTM standards to obtain a base resin powder having a size of 150 to 850 μm.

(Step 6: Surface Cross-Linking Step)

The surface cross-linking step was performed in the same manner as in Example 1 except that the components and contents of the surface cross-linking agent aqueous solution were prepared as described in Table 1 below, to prepare a super absorbent polymer of Comparative Example 3.

8) Comparative Example 4

Comparative Example 4 is prepared through a method for preparing a super absorbent polymer, including the steps of: neutralizing at least a portion of an acidic group of a water-soluble ethylenically unsaturated monomer (neutralization); cross-linking and polymerizing the water-soluble ethylenically unsaturated monomer having at least a portion of the neutralized acidic group in the presence of an internal cross-linking agent and a polymerization initiator to form a hydrogel polymer (polymerization); chopping the hydrogel polymer (chopping); drying the chopped hydrogel polymer (drying); pulverizing the dried polymer and then classifying the pulverized polymer into normal particles and fine particles (pulverization/classification); and forming a surface cross-linked layer on at least a portion of a surfaces of the normal particles in the presence of a surface cross-linking agent (surface cross-linking).

Specifically, a preparation process of Comparative Example 4 was as follows.

(Neutralization and Polymerization)

In a 3 L glass vessel equipped with a stirrer and a thermometer, 495 g of acrylic acid, 0.4 g of ethylene glycol diglycidyl ether as an internal cross-linking agent, 19.2 g of 1% IGAGURE 819 as a photopolymerization initiator, 0.6 g of capsule-type foaming agent F-36D as a foaming agent, 0.1 g of sodium dodecyl sulfate as a foaming stabilizer, and 292.6 g of water were mixed to prepare a monomer composition. Subsequently, while continuously supplying the monomer solution with a quantitative pump, 611.1 g of a 32% NaOH aqueous solution was continuously line mixed to prepare a monomer aqueous solution. In this case, after confirming that the temperature of the monomer aqueous solution rose to about 72° C. or higher due to the heat of neutralization, the temperature was allowed to cool down to 40° C. When the temperature was cooled to 40° C., 21.2 g of a mixed solution in which 41.2 g of a 2 wt % sodium persulfate aqueous solution and 0.6 g of sodium bicarbonate were dissolved in a 1 wt % sodium dodecyl sulfate aqueous solution was added. The mixed solution was placed in a 250 mm (width)×250 mm (length)×30 mm (height) stainless steel vessel, which was installed in a square polymerization reactor with a light irradiation device mounted on the top and the inside preheated to 80° C., and light irradiation was performed to induce photoinitiation. After about 15 seconds of light irradiation, it was confirmed that gel was formed from the surface, and after about 30 seconds, a polymerization reaction occurred simultaneously with foaming, and a sheet-shaped hydrogel polymer was obtained through an additional reaction for 3 minutes.

(Chopping)

The hydrogel polymer was cut into 5 cm×5 cm pieces. Then, the hydrogel was pulverized using a screw-type chopper (meat chopper) equipped with a porous plate containing a plurality of holes. In this case, the screw-type chopper had a rotation speed of 250 rpm, and the porous plate had a hole size of 10 mm.

(Drying)

1,000 g of the pulverized polymer was placed in a ventilated belt-type dryer including a porous plate capable of vertically transferring airflow. Hot air of 180° C. was flowed from bottom to top for 15 minutes so that the dried body had a moisture content of about 2%, and then flowed from top to bottom for another 15 minutes to uniformly dry the polymer, thereby preparing a dried base resin powder.

(Pulverization and Classification)

The dried base resin powder was pulverized with a pulverizer (GRAN-U-LIZER™, MPE) and then classified with a standard mesh sieve of ASTM standards to obtain a super absorbent polymer powder having a size of 150 to 850 μm.

(Surface Cross-Linking Step)

A super absorbent polymer of Comparative Example 4 was prepared by performing a surface cross-linking step in the same manner as in Example 1 using the surface cross-linking agent aqueous solution of Example 1.

TABLE 1

| | A | B | C | D | E | F | G |
|---|---|---|---|---|---|---|---|
| Example 1 | 4 | 6 | 0.08 | 0.1 | 0.2 | — | 0.1 |
| Example 2 | 4 | 6 | 0.08 | 0.1 | — | 0.1 | 0.15 |
| Example 3 | 4 | 6 | 0.1 | 0.1 | — | 0.07 | 0.1 |
| Example 4 | 5 | 6 | 0.08 | 0.1 | 0.2 | 0.03 | 0.25 |
| Comparative Example 1 | 5 | 6 | 0.1 | 0.1 | 0.4 | 0.03 | 0.1 |
| Comparative Example 2 | 5 | 6 | 0.1 | 0.1 | 0.1 | 0.2 | 0.05 |
| Comparative Example 3 | 6 | 6 | 0.1 | 0.1 | — | — | 0.25 |
| Comparative Example 4 | 4 | 6 | 0.08 | 0.1 | 0.2 | — | 0.1 |

The materials of A to G in Table 1 are as follows, and in Table 1, '-' means a component not included in the surface cross-linking agent aqueous solution, and the unit of each number is grams (g).

A: Water

B: Methanol

C: Ethylene glycol diglycidyl ether

D: Propylene glycol

E: Aluminum sulfate

F: Sucrose stearate

G: Silica

Table 1 indicates the amount of material used per 100 g of the base resin powder.

<Experimental Example 1>—Fourier-Transform Infrared Spectroscopy (FT-IR) Analysis The super absorbent polymers prepared in Examples and Comparative Examples were each analyzed by Fourier-transform infrared spectroscopy (FT-IR).

Specifically, the super absorbent polymers of Examples and Comparative Examples were prepared in powder form to be used as samples. Then, the super absorbent polymers were analyzed using a measurement method of ATR (Diamond). Accordingly, a spectrum capable of analyzing functional groups in a region corresponding to a depth of 1 μm to 2 μm with respect to an outermost layer of the polymer corresponding to the resin surface was derived.

FIG. 1 is a view showing an FTIR spectrum derived from Fourier-transform infrared spectroscopy (FT-IR) of Example 1.

Next, as shown in FIG. 2, a baseline is set with respect to BL1 and BL2 for each functional group in the FTIR spectrum, and integral values of R1 and R2 regions are calculated to determine an integral value of a specific functional group.

Specifically, for each functional group, a baseline was set (baseline correction) with respect to specific points BL1 and BL2 in Table 2 below, and then an integral value of a region of other specific points R1 and R2 in Table 2 below was obtained. The values of the specific points BL1 and BL2 and R1 and R2 in Table 2 below are determined according to functional groups.

TABLE 2

| | O—H | COOH | Asym. $COO^-$ | $CH_2$ | Sym. $COO^-$ | C—O—C, Si—O |
|---|---|---|---|---|---|---|
| BL1 ($cm^{-1}$) | 3700 | 1775 | 1775 | 1480 | 1480 | 1265 |
| BL2 ($cm^{-1}$) | 3000 | 1480 | 1480 | 1360 | 1360 | 880 |
| R1 ($cm^{-1}$) | 3600 | 1740 | 1620 | 1470 | 1425 | 1235 |
| R2 ($cm^{-1}$) | 3065 | 1650 | 1510 | 1435 | 1375 | 1000 |

That is, as shown in Table 2, the region corresponding to the COOH functional group in the FTIR spectrum is in a wavenumber range of R1 to R2, 1740 $cm^{-1}$ to 1650 $cm^{-1}$, and the integral value of the region corresponding to the COOH functional group indicates an integral value from 1740 $cm^{-1}$ to 1650 $cm^{-1}$.

Similarly, in the FTIR spectrum, the region corresponding to the $CH_2$ functional group is in a wavenumber range of R1 to R2, 1470 $cm^{-1}$ to 1435 $cm^{-1}$, and the integral value of the region corresponding to the $CH_2$ functional group indicates an integral value from 1470 $cm^{-1}$ to 1435 $cm^{-1}$.

The same description may apply to other functional groups.

The process was repeated five times for each sample to obtain an average value, and this average value was defined as an integral value of a region corresponding to a specific functional group.

In particular, the integrated value of the $CH_2$ functional group region was divided by each of the integrated value of the region corresponding to the O—H functional group, the integrated value of the region corresponding to the symmetric COO-functional group, the integrated value of the region corresponding to the asymmetric COO functional group, the integrated value of the region corresponding to the COOH functional group, and the integrated values of the regions corresponding to the C—O—C and Si—O functional groups to calculate $XX_{OH}$, $X_{COO}$, $X_{Asym,COO}$, $X_{Sym,COO}$, and $X_{C—O—C}+X_{Si—O}$.

The results are shown in Table 3 below.

In addition, the ratio of each functional group, calculated by Equations 2 to 4, is described in Table 4 below.

TABLE 3

| | $X_{OH}$ | $X_{COOH}$ | $X_{Asym.}$ $COO^-$ | $X_{Sym.}$ $COO^-$ | $X_{C—O—C}$ + $X_{Si—O}$ |
|---|---|---|---|---|---|
| Example 1 | 18.4 | 0.8 | 12.1 | 2.8 | 5.6 |
| Example 2 | 12.7 | 2.0 | 12.3 | 2.7 | 6.6 |
| Example 3 | 14.2 | 2.2 | 12.3 | 2.6 | 5.5 |
| Example 4 | 10.5 | 2.5 | 12.3 | 2.6 | 11.0 |
| Comparative Example 1 | 19.2 | 3.2 | 12.5 | 2.5 | 6.2 |
| Comparative Example 2 | 15.8 | 2.8 | 12.3 | 2.-6 | 14.7 |
| Comparative Example 3 | 12.5 | 2.7 | 11.9 | 2.5 | 16.5 |
| Comparative Example 4 | 9.5 | 3.5 | 12.5 | 3.0 | 17.0 |

TABLE 4

| | Equation 2 ($X_{COO}$ + $X_{COOH}$) | Equation 3 $X_{COOH}$ / $X_{COO}$≤ | Equation 4 ($X_{COOH}$ / $X_{Asym.\ COO}$) | Equation 5 ($X_{Asym.\ COO}$ / $X_{Sym.\ CO}$) |
|---|---|---|---|---|
| Example 1 | 15.7 | 0.052 | 0.06 | 4.26 |
| Example 2 | 17 | 0.134 | 0.16 | 4.64 |
| Example 3 | 17.1 | 0.146 | 0.18 | 4.73 |
| Example 4 | 17.4 | 0.167 | 0.2 | 4.69 |
| Comparative Example 1 | 18.2 | 0.212 | 0.25 | 5.06 |
| Comparative Example 2 | 17.7 | 0.188 | 0.23 | 4.79 |
| Comparative Example 3 | 17.1 | 0.188 | 0.23 | 4.82 |
| Comparative Example 4 | 19 | 0.226 | 0.28 | 4.17 |

<Experimental Example 2>—Amount of Extractable Contents in Water Having an Electrical Conductivity of 110 μS/Cm Extractable contents were measured for the super absorbent polymers of Examples and Comparative Examples. The extractable contents were measured using EDANA method WSP 270.2.

Specifically, 1.0 g of a sample having a particle size of 150 to 850 μm among the super absorbent polymers prepared through the methods according to Examples and Comparative Examples was placed in a 250 mL Erlenmeyer flask, and then placed in 200 mL of water having an electrical conductivity of 110 μS/cm, and stirred at 250 rpm for 1 hour to allow free swelling, and then the aqueous solution was filtered through filter paper.

The filtered solution was first titrated to a pH of 10 with 0.1 N caustic soda solution, and then back-titrated to a pH of 2.7 with 0.1 N hydrogen chloride solution to calculate non-cross-linked polymer materials as extractable contents (wt %) from the amount required for neutralization.

The measurement results of the extractable contents of Examples and Comparative Examples are shown in Table 5 below.

TABLE 5

| | Amount of extractable contents (%) | |
|---|---|---|
| | Swelling time 0.5 hr (wt %) | Swelling time 3 hr (wt %) |
| Example 1 | 5.6 | 10.2 |
| Example 2 | 7.2 | 9.4 |
| Example 3 | 6.6 | 10.4 |
| Example 4 | 5.5 | 9.7 |
| Comparative Example 1 | 1.5 | 13.2 |
| Comparative Example 2 | 12.5 | 17.1 |
| Comparative Example 3 | 12.9 | 21.5 |
| Comparative Example 4 | 13.2 | 21.7 |

As shown in Table 5 above, it was confirmed that the super absorbent polymers of Examples had a lower amount of extractable contents than Comparative Examples. That is, it is confirmed that the super absorbent polymer according to the present disclosure may reduce the amount of extractable contents by adjusting the amount of functional groups present on the polymer surface.

<Experimental Example 3>—Physical Property Evaluation

In addition, the physical properties of the super absorbent polymers prepared in Examples and Comparative Examples were evaluated using methods below and are presented in Table 6 below.

Unless otherwise indicated, all the physical property evaluations below were conducted under constant temperature and humidity (23±1° C., relative humidity 50±10%), and physiological saline solution or saline solution refers to a 0.9 wt % sodium chloride (NaCl) aqueous solution.

The samples to be measured were left under constant temperature and humidity conditions for 24 hours, and then each property was evaluated.

(1) Centrifuge Retention Capacity (CRC, g/g)

The centrifuge retention capacity of the super absorbent polymers of Examples and Comparative Examples by the absorption rate under no-load was measured according to the European Disposables and Nonwovens Association (EDANA) standard EDANA WSP 241.3.

As described in EDANA WSP 241.0, the measurement was performed at a temperature of 23±2° C. and a relative humidity of 45±15%.

Specifically, each super absorbent polymer $W_0$ (g) (about 0.2 g) obtained through Examples and Comparative Examples was uniformly placed in a nonwoven bag, sealed, and then immersed in a physiological saline solution (0.9 wt %) at room temperature. After 30 minutes, water was removed from the bag for 3 minutes using a centrifuge under the conditions of 250 G, and a mass $W_2$ (g) of the bag was measured. In addition, the same operation was performed without using the resin, and a mass $W_1$ (g) in the case was measured.

Using each obtained mass, CRC (g/g) was calculated according to Mathematical Equation 1 below.

$$CRC\,(g/g) = \{[W_2(g) - W_1(g)]/W_0(g)\} - 1 \quad \text{[Mathematical Equation 1]}$$

The measurement was repeated 5 times, and the average value and standard deviation were obtained.

The results are shown in Table 6 below.

(2) Absorbency Under Pressure (AUP: G/g)

The absorbency under pressure of 0.3 psi of the super absorbent polymers of Examples and Comparative Examples was measured according to EDANA method WSP 242.3.

As described in EDANA WSP 242.0, the measurement was performed at a temperature of 23±2° C. and a relative humidity of 45±15%.

Specifically, a 400 mesh stainless steel wire mesh was installed on the bottom of a plastic cylinder with an inner diameter of 25 mm. Under the conditions of room temperature and 50% humidity, a super absorbent polymer $W_0$ (g) (0.9 g) was evenly sprayed on the steel mesh, and a piston capable of uniformly applying a load of 0.3 psi with an outer diameter slightly smaller than 25 mm was installed thereon without a gap from the inner wall of the cylinder, and without obstruction of up-and-down movement. In this case, the weight $W_3$ (g) of the device was measured.

A glass filter with a diameter of 90 mm and a thickness of 5 mm was placed on the inside of a petri dish with a diameter of 150 mm, and a physiological saline solution composed of 0.9 wt % sodium chloride was placed so as to be at the same level as an upper surface of the glass filter. A sheet of filter paper with a diameter of 90 mm was placed thereon. The measuring device was placed on the filter paper, and the liquid was absorbed under the load for 1 hour. After 1 hour, the measuring device was lifted, and a weight $W_4$ (g) was measured.

Using each mass obtained, absorbency under pressure (g/g) was calculated according to Mathematical Equation 2 below.

$$AUP(\text{g/g}) = [W_4(\text{g}) - W_3(\text{g})]/W_0(\text{g}) \quad \text{[Mathematical Equation 2]}$$

The measurement was repeated 5 times, and the average value and standard deviation were obtained.

The results are shown in Table 6 below.

(3) Effective Absorption Capacity (EFFC)

The measured centrifuge retention capacity and absorbency under pressure were applied to Equation 4 below to calculate effective absorption capacity (EFFC).

$$EFFC = (CRC + AUP)/2 \quad \text{[Equation 7]}$$

In Equation 7,

CRC refers to centrifuge retention capacity (unit: g/g) as measured according to a method of EDANA method WSP 241.3, and AUP refers to absorbency under pressure (unit: g/g) as measured under 0.3 psi according to EDANA method WSP 242.3.

The results are shown in Table 6 below.

(4) Vortex Time

The vortex time of the super absorbent polymers of Examples and Comparative Examples was measured using a method below.

① First, 50 mL of 0.9% saline solution was added to a 100 ml beaker with a flat bottom using a 100 mL mass cylinder.

② Next, the beaker was placed in the center of a magnetic stirrer, and a circular magnetic bar (diameter: 30 mm) was placed inside the beaker.

③ Thereafter, the stirrer was operated such that the magnetic bar was stirred at 600 rpm, and a lowest portion of the vortex created by the stirring was made to touch the top of the magnetic bar.

④ After confirming that the temperature of the saline solution in the beaker was 24.0° C., 2±0.01 g of the super absorbent polymer sample was added while simultaneously operating a stopwatch, and the time until the vortex disappeared and the liquid surface became completely horizontal was measured in seconds, which was designated as the vortex time.

The results are shown in Table 6 below.

(5) Free Swelling Capacity ($FSC_{110}$) and 1-Minute Absorption Capacity ($WFA_{110}$) in Water Having an Electrical Conductivity Value of 110 μS/Cm For the super absorbent polymer of Example 1, free swelling capacity ($FSC_{110}$) and 1-minute absorption capacity ($WFA_{110}$) in water having an electrical conductivity value of 110 μS/cm were measured using the following method. The specific measurement process was as follows.

① A total of eight 2 L beakers were each filled with an 18 cm×28 cm broth tea bag.

② 1 L of water having an electrical conductivity of 110 μS/cm at 24° C. was added to the beakers, and each beaker was then left submerged for 10, 20, 30, 60, 120, 300, 600, and 1800 seconds.

③ After 10, 20, 30, 60, 120, 300, 600, and 1800 seconds, the broth tea bag was taken out from each beaker, and a weight ($W_a$) of the broth tea bag was then recorded when water no longer dripped from the broth tea bag. In particular, the weight measured when water no longer dripped from the broth tea bag taken out after 60 seconds (1 minute) was defined as $W_1$ (Blank value).

④ Another eight 2 L beakers were each filled with an 18 cm×28 cm broth tea bag.

⑤ 1 g of the super absorbent polymer (SAP) of Example 1 was accurately weighed and evenly sprinkled on the bottom of each broth tea bag.

⑥ 1 L of water having an electrical conductivity of 110 μS/cm at 24° C. was added to each beaker, and the beakers were then left submerged for 10, 20, 30, 60, 120, 300, 600, and 1800 seconds.

3 After 10, 20, 30, 60, 120, 300, 600, and 1800 seconds, the broth tea bag containing the sprinkled super absorbent polymer was taken out from each beaker, and a weight ($W_s$) of the broth tea bag containing the sprinkled super absorbent polymer was then recorded when water having an electrical conductivity of 110 μS/cm no longer dripped from the broth tea bag. In particular, the weight measured when water no longer dripped from the broth tea bag containing the sprinkled super absorbent polymer taken out after 60 seconds (1 minute) was defined as $W_2$.

⑧ The weight of the broth tea bag measured in each beaker was applied to the following Mathematical Equation 3 to calculate the free swelling capacity ($FSC_{110}$) in water having an electrical conductivity of 110 μS/cm at 24° C.

$$FSC_{110}(\text{g/g}) = W_a - W_s \quad \text{[Mathematical Equation 3]}$$

⑨ The 1-minute absorption capacity ($WFA_{110}$) in water having an electrical conductivity of 110 μS/cm was calculated using the following Mathematical Equation 4. That is, the 1-minute absorption capacity ($WFA_{110}$) in water having an electrical conductivity of 110 μS/cm indicates the free swelling capacity ($FSC_{110}$) in water having an electrical conductivity of 110 μS/cm at 24° C. calculated using a broth tea bag placed in a beaker for 1 minute.

$$WFA_{110}(g/g) = W_2 - W_1 \quad \text{[Mathematical Equation 4]}$$

In addition, experiments were additionally performed on the super absorbent polymers of Examples 2 to 4 and Comparative Examples 1 to 4 in the same manner as on the super absorbent polymer of Example 1.

The results are shown in Tables 6 and 7 below.

TABLE 6

| | CRC (g/g) | 0.3 AUP (g/g) | EFFC | Vortex time (sec) | $WFA_{110}$ (g/g) |
|---|---|---|---|---|---|
| Example 1 | 38.8 | 31.7 | 35.3 | 15 | 211 |
| Example 2 | 35.5 | 33.5 | 34.5 | 32 | 187 |
| Example 3 | 32.7 | 28.6 | 30.7 | 26 | 136 |
| Example 4 | 30.7 | 29.2 | 30.0 | 24 | 139 |
| Comparative Example 1 | 39.2 | 26.9 | 33.1 | 42 | 85 |
| Comparative Example 2 | 37.4 | 27 | 32.2 | 42 | 119 |
| Comparative Example 3 | 40.6 | 21.8 | 31.2 | 45 | 122 |
| Comparative Example 4 | 39.9 | 26.4 | 33.2 | 39 | 91 |

TABLE 7

| | Free swelling capacity ($FSC_{110}$) over time in water having an electrical conductivity of 110 μS/cm at 24° C., (g/g) Swelling time, t (s) | | | | | | | |
|---|---|---|---|---|---|---|---|---|
| | 10 | 20 | 30 | 60 | 120 | 300 | 600 | 1800 |
| Example 1 | 55 | 90 | 125 | 211 | 266 | 340 | 365 | 388 |
| Example 2 | 45 | 80 | 110 | 187 | 255 | 307 | 323 | 332 |
| Example 3 | 36 | 68 | 105 | 136 | 303 | 319 | 321 | 388 |
| Example 4 | 38 | 69 | 108 | 139 | 280 | 306 | 317 | 326 |
| Comparative Example 1 | 17 | 31 | 48 | 85 | 205 | 288 | 314 | 310 |
| Comparative Example 2 | 29 | 49 | 75 | 119 | 169 | 285 | 348 | 375 |
| Comparative Example 3 | 35 | 50 | 72 | 122 | 185 | 267 | 313 | 372 |
| Comparative Example 4 | 25 | 35 | 56 | 91 | 189 | 260 | 308 | 337 |

As shown in Tables 6 and 7, it is determined that the super absorbent polymer according to an aspect of the present disclosure may exhibit excellent property balance by improving both absorption performance, such as centrifuge retention capacity and absorbency under pressure, and vortex time.

A super absorbent polymer of the present disclosure, when applied to products, may quickly absorb body fluid and retain a large amount of body fluid without leakage. That is, the super absorbent polymer of the present disclosure exhibits excellent absorption performance, particularly exceptional initial absorption performance.

Although the super absorbent polymer has been described with reference to the specific embodiments, it is not limited thereto. Therefore, it is readily understood by those skilled in the art that various modifications and changes can be made thereto without departing from the spirit and scope of the present disclosure defined by the appended claims.

What is claimed is:

1. A super absorbent polymer, which is a polyacrylic acid (salt)-based super absorbent polymer, and comprises carbon, oxygen, and silicon on a surface thereof, wherein the super absorbent polymer has a free swell capacity, which is a maximum capacity of water holdable by the super absorbent polymer, of 130 g/g or greater, when swollen in water having an electrical conductivity of 100 to 130 μS/cm for 1 minute, and wherein a spectrum derived from analyzing the surface of the super absorbent polymer via Fourier-transform infrared spectroscopy (FT-IR) satisfies Equation 1:

$$X_{COOH} \leq 2.6 \quad \text{[Equation 1]}$$

wherein in Equation 1, $X_{COOH}$ is a value determined by dividing an integrated value of a region corresponding to a COOH functional group within the spectrum by an integrated value of a region corresponding to a $CH_2$ functional group within the spectrum.

2. The super absorbent polymer of claim 1, wherein the spectrum further satisfies Equation 2:

$$X_{COO} + X_{COOH} \leq 18 \quad \text{[Equation 2]}$$

wherein in Equation 2, $X_{COO}$ is a value determined by dividing an integrated value of a region corresponding to an asymmetric COO group and a symmetric COO functional group within the spectrum by an integrated value of a region corresponding to a $CH_2$ functional group within the spectrum.

3. The super absorbent polymer of claim 1, wherein the spectrum further satisfies Equation 3:

$$X_{COOH}/X_{COO} \leq 0.17 \quad \text{[Equation 3]}$$

wherein in Equation 3, $X_{COO}$ is a value determined by dividing an integrated value of a region corresponding to an asymmetric $COO^-$ functional group and a symmetric COO functional group within the spectrum by an integrated value of a region corresponding to a $CH_2$ functional group within the spectrum.

4. The super absorbent polymer of claim 1, wherein the spectrum further satisfies Equation 4:

$$X_{COOH}/X_{Asym.COO} \leq 0.22 \quad \text{[Equation 4]}$$

wherein in Equation 4, $X_{Asym,COO}$ is a value determined by dividing an integrated value of a region corresponding to an asymmetric $COO^-$ functional group within the spectrum by an integrated value of a region corresponding to a $CH_2$ functional group within the spectrum.

5. The super absorbent polymer of claim 1, wherein the spectrum further satisfies Equation 5:

$$X_{Asym.COO}/X_{Sym.COO} \leq 4.75 \quad \text{[Equation 5]}$$

wherein in Equation 5, $X_{Asym,COO}$ is a value determined by dividing an integrated value of a region corresponding to an asymmetric COO functional group within the spectrum by an integrated value of a region corresponding to a $CH_2$ functional group within the spectrum, and $X_{Sym,COO}$ is a value determined by dividing an integrated value of a region corresponding to a symmetric COO functional group within the spectrum by an integrated value of a region corresponding to a $CH_2$ functional group within the spectrum.

6. The super absorbent polymer of claim 1, wherein the spectrum further satisfies Equation 6:

$$X_{C\text{-}O\text{-}C} + X_{Si\text{-}O} \leq 14 \quad \text{[Equation 6]}$$

wherein in Equation 6, $X_{C—O—C}$ is a value determined by dividing an integrated value of a region corresponding to a C—O—C functional group within the spectrum by an integrated value of a region corresponding to a $CH_2$ functional group within the spectrum, and $X_{Si—O}$ is a value determined by dividing an integrated value of a region corresponding to an Si—O functional group within the spectrum by an integrated value of a region corresponding to a $CH_2$ functional group within the spectrum.

7. The super absorbent polymer of claim 1, wherein extractable contents are present in an amount of 10 wt % or less with respect to a total weight of the super absorbent polymer as measured after free swelling in water having an electrical conductivity of 100 to 130 μS/cm for 30 minutes.

8. The super absorbent polymer of claim 1, wherein extractable contents are present in an amount of 17 wt % or less with respect to a total weight of the super absorbent polymer as measured after free swelling in water having an electrical conductivity of 100 to 130 μS/cm for 3 hours.

9. The super absorbent polymer of claim 1, having a centrifuge retention capacity (CRC) of 30 g/g or greater as measured according to a method of EDANA method WSP 241.3.

10. The super absorbent polymer of claim 1, having an absorbency under pressure (AUP) of 25 g/g or greater as measured under 0.3 psi according to EDANA method WSP 242.3.

11. The super absorbent polymer of claim 1, having an effective absorption capacity (EFFC) of 30 g/g or greater as calculated by Equation 7:

$$EFFC = (CRC + AUP)/2 \quad \text{[Equation 7]}$$

wherein in Equation 7,

CRC is a centrifuge retention capacity (unit: g/g) as measured according to a method of EDANA method WSP 241.3, and AUP is an absorbency under pressure (unit: g/g) as measured under 0.3 psi according to EDANA method WSP 242.3.

12. The super absorbent polymer of claim 1, having a vortex time of 40 seconds or less as measured at 24.0° C. by a vortex measurement method.

13. The super absorbent polymer of claim 2, wherein the $X_{COO}$ is 16 or less.

14. The super absorbent polymer of claim 4, wherein the $X_{Asym,COO}$ is 13 or less.

15. The super absorbent polymer of claim 5, wherein the $X_{Sym,COO}$ is 3 or less.

16. The super absorbent polymer of claim 1, further comprising at least one of sodium, nitrogen, aluminum, or sulfur on the surface thereof.

17. A method for preparing the super absorbent polymer of claim 1, comprising:

step 1 of preparing a monomer composition comprising a water-soluble ethylenically unsaturated monomer having an acid group, an internal cross-linking agent, and a polymerization initiator, and polymerizing the monomer composition to form a polymer having acidic groups;

step 2 of micronizing the polymer in the presence of a surfactant;

step 3 of neutralizing at least a portion of the acidic groups of the polymer;

step 4 of drying the micronized and neutralized polymer to prepare a base resin powder;

step 5 of pulverizing the dried base resin powder; and step 6 of forming a surface cross-linked layer on at least a portion of a surface of the pulverized base resin powder in the presence of a surface cross-linking agent to form the super absorbent polymer.

18. The method of claim 17, wherein the step 2 and the step 3 are performed sequentially, alternately, or simultaneously.

19. The method of claim 17, wherein a degree of the neutralizing is 50 to 90 mol %.

* * * * *